United States Patent
Ghorbal et al.

(10) Patent No.: US 7,748,405 B2
(45) Date of Patent: Jul. 6, 2010

(54) SYSTEM, METHOD AND APPARATUS FOR REDUCING FRICTIONAL FORCES AND FOR COMPENSATING SHAPE MEMORY ALLOY-ACTUATED VALVES AND VALVE SYSTEMS AT HIGH TEMPERATURES

(75) Inventors: Ali Ghorbal, Antioch, CA (US); Sandheep K. Surendran, San Francisco, CA (US); Andrei Szilagyi, Danville, CA (US); Peter Emery von Behrens, Antioch, CA (US); Jean-Pierre Maeder, Moraga, CA (US)

(73) Assignee: Alfmeier Prazision AG Baugruppen und Systemlosungen, Treuchitlingen (DE)

( * ) Notice: Subject to any disclaimer, the term of this patent is extended or adjusted under 35 U.S.C. 154(b) by 1521 days.

(21) Appl. No.: 10/934,825

(22) Filed: Sep. 3, 2004

(65) Prior Publication Data

US 2007/0277877 A1    Dec. 6, 2007

Related U.S. Application Data

(60) Provisional application No. 60/500,718, filed on Sep. 5, 2003.

(51) Int. Cl.
  *F16K 31/06*    (2006.01)
(52) U.S. Cl. ............... 137/596.17; 251/11; 251/336
(58) Field of Classification Search ...... 137/596–596.2; 251/11, 336; 60/527
  See application file for complete search history.

(56) References Cited

U.S. PATENT DOCUMENTS

| 240,059 A | 4/1881 | Wales |
| 348,841 A | 9/1886 | Hainley |
| 1,148,986 A | 8/1915 | Prinz |
| 1,288,060 A | 12/1918 | Le Duc |

(Continued)

FOREIGN PATENT DOCUMENTS

DE    19509177    9/1996

(Continued)

OTHER PUBLICATIONS

Abstract of DE 4209815 published Sep. 30, 1993.

(Continued)

*Primary Examiner*—John Rivell
*Assistant Examiner*—Craig Price
(74) *Attorney, Agent, or Firm*—Dority & Manning, P.A.

(57) ABSTRACT

A valve system including a number of shape memory alloy ("SMA")-actuated valves for controlling the flow of fluids is disclosed as is a variety of types of SMA-actuated valves and methods of operation. In one embodiment, a valve system includes a housing having a substantially closed cavity as well as a second port for communicating a fluid. Further, the valve system includes a first SMA actuator configured to control the position of the first seal to vary fluid flow through the firs port, and a first temperature compensator for adjusting the position of the seal by an amount proportional to temperature. A second SMA-actuated valve, driven by either a unidirectional or a bidirectional SMA actuator, controls the position of the second seal to vary fluid flow through the second port, and a second temperature compensator for adjusting the position of the second seal by another amount proportional to temperature.

18 Claims, 17 Drawing Sheets

U.S. PATENT DOCUMENTS

| | | | |
|---|---|---|---|
| 1,658,669 A | 2/1928 | Cohn et al. |
| 2,518,941 A | 8/1950 | Satchwell et al. |
| 2,975,307 A | 3/1961 | Schroeder et al. |
| 3,280,550 A | 10/1966 | Cassidy |
| 3,436,016 A | 4/1969 | Edwards |
| 3,452,175 A | 6/1969 | Wilkes |
| 3,452,309 A | 6/1969 | Wilkes |
| 3,474,964 A | 10/1969 | Woodling |
| 3,634,803 A | 1/1972 | Willson et al. |
| 3,641,296 A | 2/1972 | Schwarz |
| 3,664,582 A | 5/1972 | Jackson et al. |
| 3,725,835 A | 4/1973 | Hopkins et al. |
| 3,748,197 A | 7/1973 | Willson et al. |
| 3,797,450 A | 3/1974 | Frisbee |
| 3,940,935 A | 3/1976 | Richardson et al. |
| 3,946,699 A | 3/1976 | Mirshak |
| 4,024,845 A * | 5/1977 | Nomura ................. 251/11 |
| 4,027,953 A | 6/1977 | Jacob |
| 4,134,542 A | 1/1979 | Sugiura |
| 4,150,544 A | 4/1979 | Pachter |
| 4,233,779 A | 11/1980 | Griffith |
| 4,319,659 A | 3/1982 | Heckelman et al. |
| 4,427,216 A | 1/1984 | Kato et al. |
| 4,472,939 A | 9/1984 | Wang |
| 4,497,241 A | 2/1985 | Ohkata |
| 4,541,326 A | 9/1985 | Fukuda et al. |
| 4,553,393 A | 11/1985 | Ruoff |
| 4,559,512 A | 12/1985 | Yaeger et al. |
| 4,579,006 A | 4/1986 | Hosoda et al. |
| 4,586,335 A | 5/1986 | Hosoda et al. |
| 4,626,085 A | 12/1986 | Suzuki |
| 4,652,781 A | 3/1987 | Andrei-Alexandru et al. |
| 4,699,314 A | 10/1987 | Faurie |
| 4,716,731 A | 1/1988 | Sakai et al. |
| 4,736,587 A | 4/1988 | Suzuki |
| 4,742,680 A | 5/1988 | Mecca |
| 4,751,821 A | 6/1988 | Birchard |
| 4,761,955 A | 8/1988 | Bloch |
| 4,806,815 A | 2/1989 | Honma |
| 4,811,564 A | 3/1989 | Palmer |
| 4,829,767 A | 5/1989 | Mecca |
| 4,841,730 A | 6/1989 | McDonald |
| 4,884,557 A | 12/1989 | Takehana et al. |
| 4,887,430 A | 12/1989 | Kroll et al. |
| 4,914,908 A | 4/1990 | Sugiyama et al. |
| 4,932,210 A | 6/1990 | Julien et al. |
| 4,958,687 A | 9/1990 | Nakagawa |
| 4,977,886 A | 12/1990 | Takehana et al. |
| 4,979,672 A | 12/1990 | AbuJudom, II et al. |
| 4,996,617 A | 2/1991 | Yaeger et al. |
| 5,014,520 A | 5/1991 | Orner et al. |
| 5,054,522 A | 10/1991 | Kowanz et al. |
| 5,092,781 A | 3/1992 | Casciotti et al. |
| 5,107,916 A | 4/1992 | Van Roermund et al. |
| 5,127,228 A | 7/1992 | Swenson |
| 5,129,753 A | 7/1992 | Wesley et al. |
| 5,165,897 A | 11/1992 | Johnson |
| 5,166,832 A | 11/1992 | Zychowicz |
| 5,172,551 A | 12/1992 | Nakajima et al. |
| 5,182,910 A | 2/1993 | Benecke |
| 5,235,225 A | 8/1993 | Colgate et al. |
| 5,275,219 A | 1/1994 | Giacomel |
| 5,279,123 A | 1/1994 | Wechsler et al. |
| 5,306,979 A | 4/1994 | Schwarz, Jr. |
| 5,312,152 A | 5/1994 | Woebkenberg, Jr. et al. |
| 5,329,873 A | 7/1994 | Tiballi |
| 5,344,506 A | 9/1994 | DeAngelis |
| 5,353,735 A | 10/1994 | Arai et al. |
| 5,396,769 A | 3/1995 | Brudnicki |
| 5,417,487 A | 5/1995 | Dahnert |
| 5,499,702 A | 3/1996 | Wang |
| 5,553,328 A | 9/1996 | Hall et al. |
| 5,556,370 A | 9/1996 | Maynard |
| 5,563,466 A | 10/1996 | Rennex et al. |
| 5,578,053 A | 11/1996 | Yoon |
| 5,588,717 A | 12/1996 | Kim et al. |
| 5,618,066 A | 4/1997 | Fu-Hsiang |
| 5,619,177 A | 4/1997 | Johnson et al. |
| 5,624,012 A | 4/1997 | Wang |
| 5,629,662 A | 5/1997 | Floyd et al. |
| 5,685,148 A | 11/1997 | Robert |
| 5,685,149 A | 11/1997 | Schneider et al. |
| 5,694,663 A | 12/1997 | Tserng |
| 5,713,870 A | 2/1998 | Yoon |
| 5,747,993 A | 5/1998 | Jacobsen et al. |
| 5,763,979 A | 6/1998 | Mukherjee et al. |
| 5,770,913 A | 6/1998 | Mizzi |
| 5,771,742 A | 6/1998 | Bokaie et al. |
| 5,779,386 A | 7/1998 | Eichorn |
| 5,816,306 A | 10/1998 | Giacomel |
| 5,829,253 A | 11/1998 | Long et al. |
| 5,847,475 A | 12/1998 | Rauch et al. |
| 5,865,418 A | 2/1999 | Nakayama et al. |
| 5,901,554 A | 5/1999 | Greschik |
| 5,917,260 A | 6/1999 | Garcia et al. |
| 5,933,002 A | 8/1999 | Jacobsen et al. |
| 5,975,468 A | 11/1999 | Moignier et al. |
| 5,990,777 A | 11/1999 | Whiteman, Jr. |
| 6,008,992 A | 12/1999 | KawaKami |
| 6,019,113 A | 2/2000 | Allston et al. |
| 6,023,121 A | 2/2000 | Dhuler et al. |
| 6,069,420 A | 5/2000 | Mizzi et al. |
| 6,073,469 A | 6/2000 | Julien |
| 6,102,917 A | 8/2000 | Maitland et al. |
| 6,102,933 A | 8/2000 | Lee et al. |
| 6,126,115 A | 10/2000 | Carrier et al. |
| 6,133,816 A | 10/2000 | Barnes et al. |
| 6,137,206 A | 10/2000 | Hill |
| 6,145,369 A | 11/2000 | Corbin et al. |
| 6,164,784 A | 12/2000 | Buttera et al. |
| 6,218,762 B1 | 4/2001 | Hill et al. |
| 6,247,493 B1 * | 6/2001 | Henderson ................. 137/487.5 |
| 6,247,678 B1 | 6/2001 | Hines et al. |
| 6,255,934 B1 | 7/2001 | Gadini et al. |
| 6,313,562 B1 | 11/2001 | Barnes et al. |
| 6,326,707 B1 | 12/2001 | Gummin et al. |
| 6,327,855 B1 | 12/2001 | Hill et al. |
| 6,333,583 B1 | 12/2001 | Mahadevan et al. |
| 6,363,183 B1 | 3/2002 | Koh |
| 6,364,496 B1 | 4/2002 | Boddy et al. |
| 6,367,252 B1 | 4/2002 | Hill et al. |
| 6,371,030 B1 | 4/2002 | Gilman et al. |
| 6,374,608 B1 | 4/2002 | Corris et al. |
| 6,390,878 B1 | 5/2002 | Zhou et al. |
| 6,404,098 B1 | 6/2002 | Kayama et al. |
| 6,425,343 B1 | 7/2002 | Akers et al. |
| 6,434,333 B2 | 8/2002 | Tanaka et al. |
| 6,434,962 B1 | 8/2002 | Moretti et al. |
| 6,441,746 B1 | 8/2002 | Taborisskiy et al. |
| 6,446,876 B1 | 9/2002 | Stefano et al. |
| 6,450,064 B1 | 9/2002 | Christiansen et al. |
| 6,464,200 B1 * | 10/2002 | Hines et al. ................. 251/11 |
| 6,494,225 B1 * | 12/2002 | Olewicz et al. ................. 251/11 |
| 6,508,437 B1 | 1/2003 | Davis et al. |
| 6,516,146 B1 | 2/2003 | Kosaka |
| 6,527,310 B1 | 3/2003 | Bellamy |
| 6,530,718 B2 | 3/2003 | Nygren et al. |
| 6,542,133 B1 | 4/2003 | Kelman et al. |
| 6,543,224 B1 | 4/2003 | Barooah |
| 6,574,958 B1 | 6/2003 | MacGregor |
| 6,741,184 B1 | 5/2004 | Miller et al. |
| 6,834,835 B1 | 12/2004 | Knowles et al. |
| 6,851,260 B2 | 2/2005 | Mernoe |
| 7,055,793 B2 * | 6/2006 | Biehl et al. ................. 251/11 |

| | | | |
|---|---|---|---|
| 7,093,817 B2* | 8/2006 | MacGregor et al. | 251/11 |
| 7,484,528 B2* | 2/2009 | Beyerlein et al. | 137/596.17 |
| 2001/0050232 A1* | 12/2001 | Hill et al. | 205/82 |
| 2002/0113499 A1 | 8/2002 | Von Behrens et al. | |
| 2003/0106761 A1 | 6/2003 | Taylor | |
| 2004/0035108 A1 | 2/2004 | Szilagyi | |
| 2004/0035687 A1 | 2/2004 | Von Behrens et al. | |
| 2004/0112049 A1 | 6/2004 | Von Behrens et al. | |
| 2005/0005634 A1* | 1/2005 | Eberhardt et al. | 251/213 |
| 2005/0173661 A1* | 8/2005 | Mignon et al. | 251/11 |
| 2007/0023089 A1* | 2/2007 | Beyerlein et al. | 137/596.17 |

FOREIGN PATENT DOCUMENTS

| | | |
|---|---|---|
| FR | 2384944 | 10/1978 |
| FR | 0147491 | 7/1985 |
| FR | 2730766 | 8/1996 |
| GB | 2068545 | 8/1981 |
| GB | 2093589 | 9/1982 |
| GB | 2334046 | 8/1999 |
| JP | 62175628 | 8/1987 |
| JP | 62271970 | 11/1987 |
| JP | 07198502 | 8/1995 |
| JP | 07274561 | 10/1995 |
| JP | 09127398 | 5/1997 |
| WO | WO 9808355 | 2/1998 |
| WO | WO 0112985 | 2/2001 |

OTHER PUBLICATIONS

Abstract of DE 19509177 published Sep. 19, 1996.
Abstract of FR 2384944 published Oct. 20, 1978.
Abstract of FR 2730766 published Aug. 23, 1996.
Abstract of JP 07274561 published Oct. 20, 1995.
Abstract of JP 62175628 published Aug. 1, 2987.
Abstract of JP 62271970 published Nov. 26, 1987.
Abstract of JP 07198502 published Aug. 1, 1995.
Abstract of JP 09127398 published May 16, 1997.
Abstract of KR 9605617 published Apr. 30, 1996.
Abstract of KR 9607599 published Jun. 7, 1996.
Aircraft Maneuverability, http://www.cs.ualberta.ca/~database/MEMS/sma_mems/flap.html, last modified Aug. 17, 2001, printed Apr. 17, 2003, pp. 1-2.
Bokaie, Latch-Relase Pin Puller with Shape-Memory Alloy Actuator, Lewis Research Center, http://www.nasatech.com/Briefs/Feb98/LEW16511.html, printed Apr. 17, 2003.
Bone Plates, http://www.cs.ualberta.ca/~database/MEMS/sma_mems/bone.html, last modified Aug. 17, 2001, printed Apr. 17, 2003, pp. 1-2.
Glossary: Pseudo-elasticity (or super-elasticity), http://www.cs.ualberta.ca/~database/MEMS/sma_mems/glossary.cgi, last modified Aug. 17, 2001, printed Apr. 17, 2003.
Glossary: Shape Memory Effect, http://www.cs.ualberta.ca/~database/MEMS/sma_mems/glossary.cgi, last modified Aug. 17, 2001, printed Apr. 17, 2003.
Grant el al, "Variable Structure Control of Shape Memory Alloy Actuators," IEEE Control Systems 17(3) 80-88, 1997.
Hashimoto et al., "Application of Shape Memory Alloy to Robotic Actuators," J. Robotic Systems 2(1):3-25, 1985.
Hirose et al., "A new desgin of servo-actuators based on the shape memory effect," Theory and Practice of Robots and Manipulators, 339-349, 1984.
Hodgson et al., Shape Memory Alloys, http://www.sma-inc.com/SMAPaper.html, 1999 printed Aril 17, 2003.
Ikuta et al., "Mathematical model and experimental verification . . . ," IEEE Robotics and Automation 4:103-108, 1991.
Ikuta et al., Shape Memory Alloys, http://www.sma-inc.com/SMAPaper.html, 1999, printed Apr. 17, 2003.
Ikuta, "Micro/Miniature Shape Memory Alloy Actuator," IEEE Robotics and Automation 3:2156-2161, 1990.
Kuribayashi, "A New Actuator of a Joint Mechanism Using TiNi Alloy Wire," Int. J. Robotics 4(4):47-58, 1986.
Mills JW, Lukasiewicz; Insect: The Role of Continuous-Valued Logic in a Mobile Robot's Sensors, Control, and Locomotion,: in Siquito: Advanced Experiments with a Simple and Inexpensive Robot Chapter 12, pp. 197-211, IEEE Computer Society Press, Los Alamitos, CA USA ISBN 0-8186-7408-3, 1993.
Otsuka et al., "Shape Memory Materials," pp. 36-48, Cambridge University Press, Cambridge, England, 1998, ISBN 0-521-44487X.
Rediniotis et al., Development of aa Shape-Memory-Alloy Actuated Biomimetic Hydrofoil, Journal for Intelligent Material Systems and Structures, 13:35-49, 2002.
Robotic Muscles, http://www.cs.ualberta.ca/~database/MEMS/sma_mems/muscle.html, last modified Aug. 17, 2001, printed Apr. 17, 2003.
Shape Memory Alloys, http://www.cs.ualberta.ca/~database/MEMs/sma_mems/sma.html, last modified Aug. 17, 2001, printed Apr. 17, 2003.
Smith et al., Development of Shape Memory Alloy (SMA) Actuated Mechanisms for Spacecraft Release Applications, SSC99-XI-7, 13th AIAA/USU Conference on Small Satellites.
Technical Characteristics of FLEXINOL™ Actuator Wires, Dynalloy, Inc., printed on Feb. 26, 2001.
WPI Database XP002202662, "Shape memory metal actuatory control device—has minimum and maximum detector to monitor state of actuator based on its minimum and maximum allowable impedance," Oct. 20, 1995.

* cited by examiner

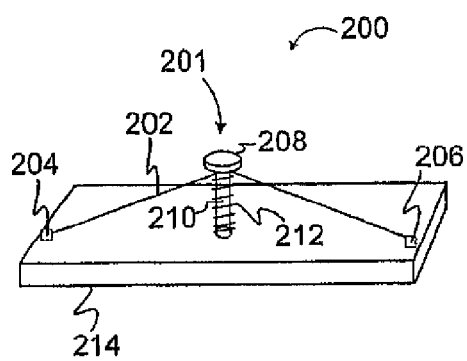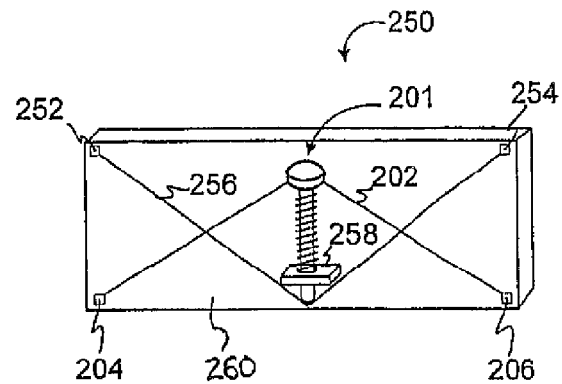
FIG. 2A
FIG. 2B
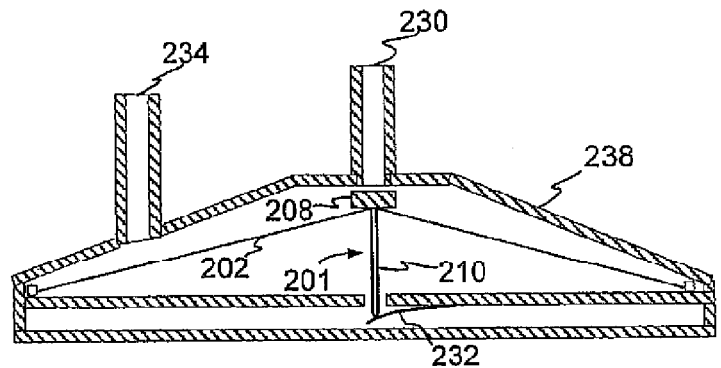
FIG. 2C
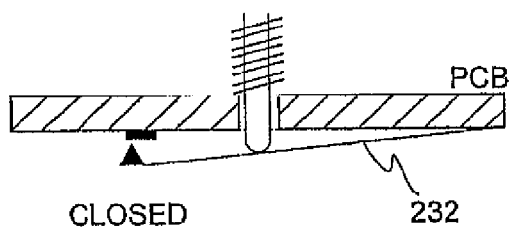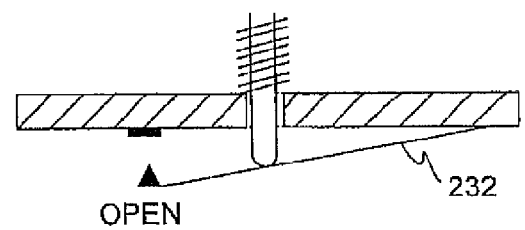
FIG. 3A
FIG. 3B
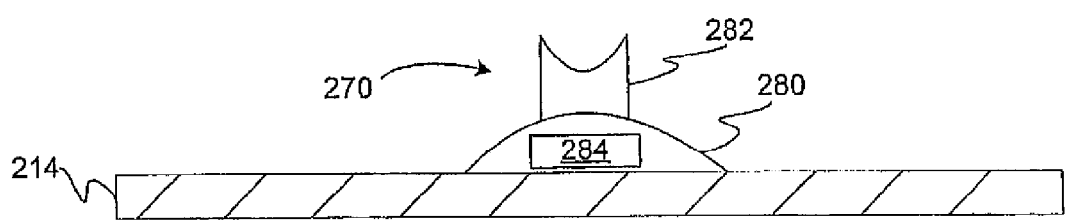
FIG. 3C

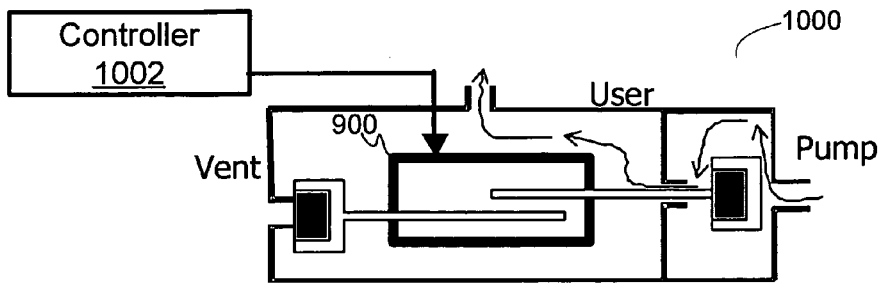

FIG. 10A

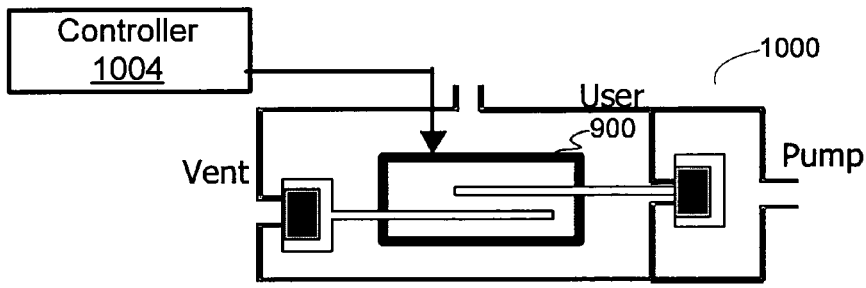

FIG. 10B

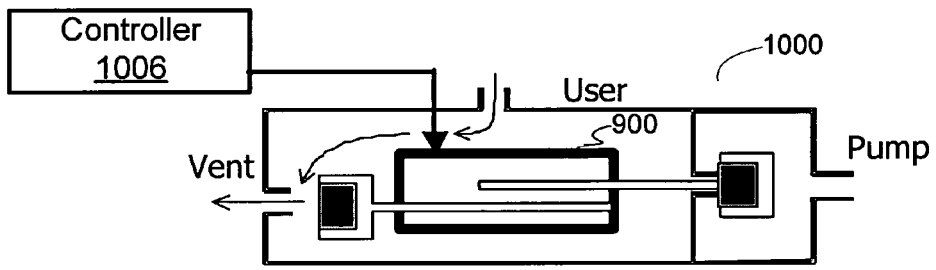

FIG. 10C

| 1050 | 1052 | | | 1054 | 1056 | | 1058 | | | 1060 |
|---|---|---|---|---|---|---|---|---|---|---|
| | Logic levels | | | Main switch | DBNM Output | | Valve state | | | Description |
| State | L1 | L2 | L3 | | 1 | 2 | Vent | Pump | User | |
| 1 | Any | Any | Any | Off | Extended | Retracted | Closed | Closed | Isolated | Hold inflation level |
| 2 | 1 | 0 | 1 | On | Extended | Extended | Closed | Open | Inflating | |
| 3 | 0 | 1 | 1 | On | Extended | Retracted | Closed | Closed | Isolated | Close after inflating |
| 4 | 0 | 1 | 0 | On | Retracted | Retracted | Open | Closed | Deflating | Initial venting |
| 5 | 1 | 1 | 0 | On | Retracted | Retracted | Open | Closed | Deflating | Sustained venting |
| 6 | 0 | 0 | 1 | On | Extended | Retracted | Closed | Closed | Isolated | Close after deflating |

FIG. 10D

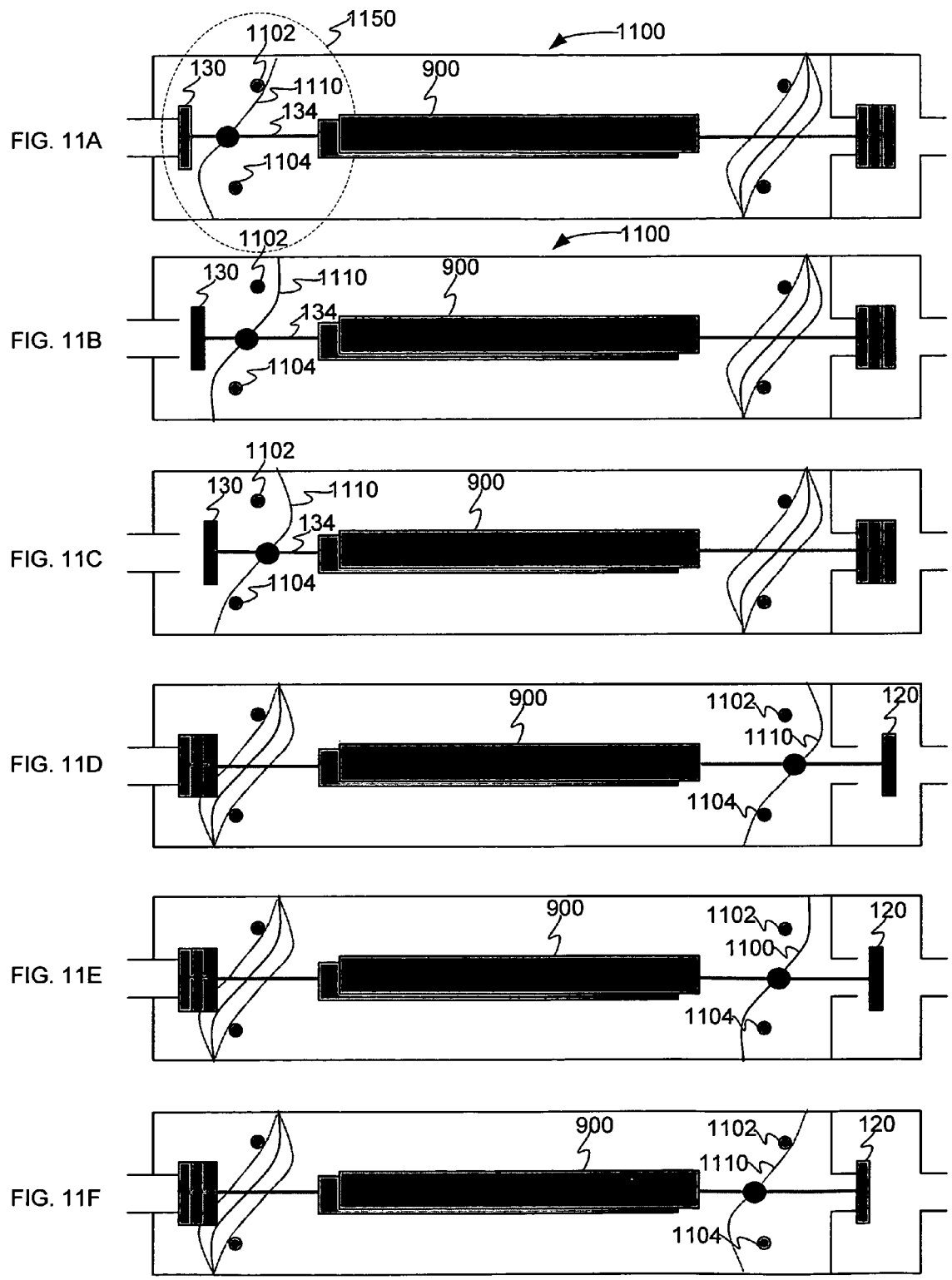

US 7,748,405 B2

SYSTEM, METHOD AND APPARATUS FOR REDUCING FRICTIONAL FORCES AND FOR COMPENSATING SHAPE MEMORY ALLOY-ACTUATED VALVES AND VALVE SYSTEMS AT HIGH TEMPERATURES

CLAIM OF PRIORITY

This application claims benefit under 35 U.S.C. 119(e) of U.S. Provisional Patent Application No. 60/500,718 filed Sep. 5, 2003 entitled "Temperature Compensated Valves actuated by SMA," the disclosure of which is incorporated herein by reference in its entirety.

FIELD OF THE INVENTION

The present invention relates generally to valves and valve systems, and in particular, to shape memory alloy ("SMA")-actuated valves and valve systems that are configured to reduce operational friction forces as well as to compensate for temperature effects on SMA actuators, especially at relatively high temperatures.

BACKGROUND OF THE INVENTION

Spool valves are commonly employed in a variety of applications to control fluid transport from one or more sources. A typical spool valve consists of a stationary body with a cylindrical cavity machined therein and a spool-like piston for providing for fluid flow control. Such valves are commonly used as "three-way, three-position" and "four-way, three-position" valves, where the number of ways coincide with the number of ports (e.g., an inlet port, one or more outlet ports and an exhaust port) and each of the number of positions is a unique state for the ports (e.g., inlet and outlet ports all closed, only the inlet port is open, or only a outlet port is open). The piston of a spool valve has a cylindrical shape adapted to fit and slide within the cavity of the valve. The stationary valve body includes openings, or ports, each opening having operational states of closed, partially-opened or fully opened. In operation, a piston slides within the cavity to place one port in fluid communication with other such ports. To minimize leaks, the space between the stationary body and the piston is machined to have a tight tolerance, with viscous lubricants added to further minimize inadvertent leakage among ports. Also, spool valves typically use compliant seals, such as O-rings, to further minimize leaks due to imperfections in machining to tight tolerances. But these efforts to reduce leakage introduce friction into the valve, which an actuator must overcome to drive the piston.

Spool valves are designed to control fluid flow with a single actuator. But in practice, the frictional forces require either at least two actuators or a single higher-force actuator to overcome the friction. But using these types of actuators requires higher power consumption, a larger form factor and greater weight than otherwise might be used, some of these factors precluding the use of these types of valves in some classes of products.

To reduce the power and weight of valve actuators, some traditional approaches have integrated shape memory alloys ("SMA") elements into valves. But nevertheless, the frictional drag exerted by sliding pistons of the spool valves have continued to present an obstacle to increasing the number of valve applications and their performance (e.g., in terms of longevity and reliability). Another drawback to these approaches is that they do not sufficiently compensate for temperature effects on the SMA elements.

In view of the foregoing, what is needed is an improved valve and valve system using SMA actuators to overcome the drawbacks of conventional valves and to adapt SMA actuators to compensate for a broad range of temperatures that otherwise would affect SMA actuator operation.

SUMMARY OF THE INVENTION

A valve system including a number of shape memory alloy ("SMA")-actuated valves for controlling the flow of fluids is disclosed as is a variety of types of SMA-actuated valves and methods of operation. In one embodiment, a valve system includes a housing having a substantially closed cavity as well as a first and a second port for communicating a fluid. Further, the valve system includes a first SMA actuated valve; driven by a first bidirectional SMA actuator, the first SMA actuated valve being configured to control the position of the first seal to vary fluid flow through the first port, the valve system further including a first temperature compensator for counteracting the effect of ambient temperature on the first SMA actuator. A second SMA-actuated valve, driven by a either a unidirectional or bidirectional SMA actuator, controls the position of the second seal to vary fluid flow through the second port, and a second temperature compensator for adjusting the position of the second seal by another amount proportional to temperature. In a specific embodiment, at least the first temperature compensator is a temperature compensating SMA for providing a compensating linear force to counter the contraction forces of the SMA wires of one of the SMA actuators above a certain temperature. In other embodiments, at least one of the first or the second temperature compensators is a driver circuit configured to make adjustments dependent on temperature, for example, by decreasing current passing though the SMA wire with increasing temperature. In yet another specific embodiment, the second SMA-actuated valve further comprises a bidirectional SMA actuator being disposed within the cavity. The bidirectional SMA actuator includes at least three rigid parallel elongate members, each having a long axis and being slideable relative to one another parallel to that long axis, each connected one to another by an SMA wire. In some aspects, a top plate of the bidirectional SMA actuator is rigidly affixed to an anchor point in the cavity and a bottom plate includes the second seal.

In another embodiment, a bidirectional SMA-actuated valve controls the flow of fluids. The bidirectional SMA-actuated valve comprises a housing having a substantially closed cavity for maintaining a fluid, the housing including a first port and a second port for communicating a fluid. The housing includes a first chamber accessible via the first port, a first seal in the first chamber, a second seal in the cavity, and a bidirectional SMA actuator having a first output coupled to the first seal and a second output coupled to the second seal. The bidirectional SMA actuator is configured to power a first set of SMA wires to control the first seal and a second set of SMA wires to control the second seal. In some embodiments of the present invention, a bidirectional SMA-actuated valve further comprises a temperature compensating driver circuit configured to adjust an amount of actuation based on temperature by, for example, decreasing current passing though the SMA wire with increasing temperature.

In yet another embodiment, a shape memory alloy ("SMA")-actuated valve controls the flow of fluids. The SMA-actuated valve comprises a housing having a substantially closed cavity for maintaining a fluid, the housing including a first port and a second port for communicating a fluid. The housing also includes a first deformable wall and a second deformable wall rigidly coupled to the first deformable wall, whereby both of deformable walls move in tandem. Further, the housing includes a first chamber accessible via the first port, a second seal in the cavity, a driver circuit configured to adjust the amount dependent on temperature by decreasing current passing though the SMA wire with increasing temperature, and a linkage system configured to open the first seal and to close the second seal when the first and the second deformable walls move in one direction and further configured to close the first seal and to open the second seal when the first and the second deformable walls move in another direction. In one case, an SMA actuator is coupled to the first deformable wall to control movement of the first and the second deformable walls, the SMA actuator disposed external to the cavity.

BRIEF DESCRIPTION OF THE DRAWINGS

The invention is more fully appreciated in connection with the following detailed description taken in conjunction with the accompanying drawings, in which:

FIGS. 2A to 2C depict various wire-based SMA actuators suitable to implement SMA actuators of FIGS. 1A and 1B, according to one embodiment of the present invention;

FIGS. 3A to 3C depict end of travel switches in accordance with an embodiment of the present invention;

FIGS. 10A to 10D illustrate a valve assembly including bidirectional SMA actuator of FIGS. 9A to 9C, according a specific embodiment of the present invention;

FIGS. 11A to 11F illustrate a valve assembly including a bidirectional SMA actuator that implements bi-stable outputs, according to a specific embodiment of the present invention;

Like reference numerals refer to corresponding parts throughout the several views of the drawings.

DETAILED DESCRIPTION OF EXEMPLARY EMBODIMENTS

A valve system including a number of shape memory alloy ("SMA")-actuated valves for controlling the flow of fluids is disclosed, as is a variety of types of SMA-actuated valves and methods of operation. In one embodiment, a valve system includes a housing having a substantially closed cavity as well as a first and a second port for communicating a fluid. Further, the valve system includes a first SMA actuated valve, driven by a first SMA actuator, configured to control the position of the first seal to vary fluid flow through the first port, and a first temperature compensator for counteracting the effect of ambient temperature on the first SMA actuator. A second SMA-actuated valve, being driven by a bidirectional SMA actuator, controls the position of the second seal to vary fluid flow through the second port, and a second temperature compensator for counteracting the effect of ambient temperature on the second SMA actuator. Advantageously, either of the first and the second SMA actuator, or both, can be an SMA-actuated valve according to some embodiments of the present invention. As such, the SMA actuators can be formed with a relatively compact form factor so as to preserve space that otherwise would be consumed by spool valves powered by dual actuators and/or large-sized actuators, both of which consume a relatively large amount of power for overcoming large frictional forces inherent in sliding a piston to operate the spool valves. Moreover, SMA-actuated valves in accordance with various embodiments of the present invention are configured to compensate for excursions in ambient temperature over a broad range of temperatures. With a few number of elements necessary to implement SMA-actuated valves, these types of valves are relatively simple and less costly to manufacture.

Figure 1A:
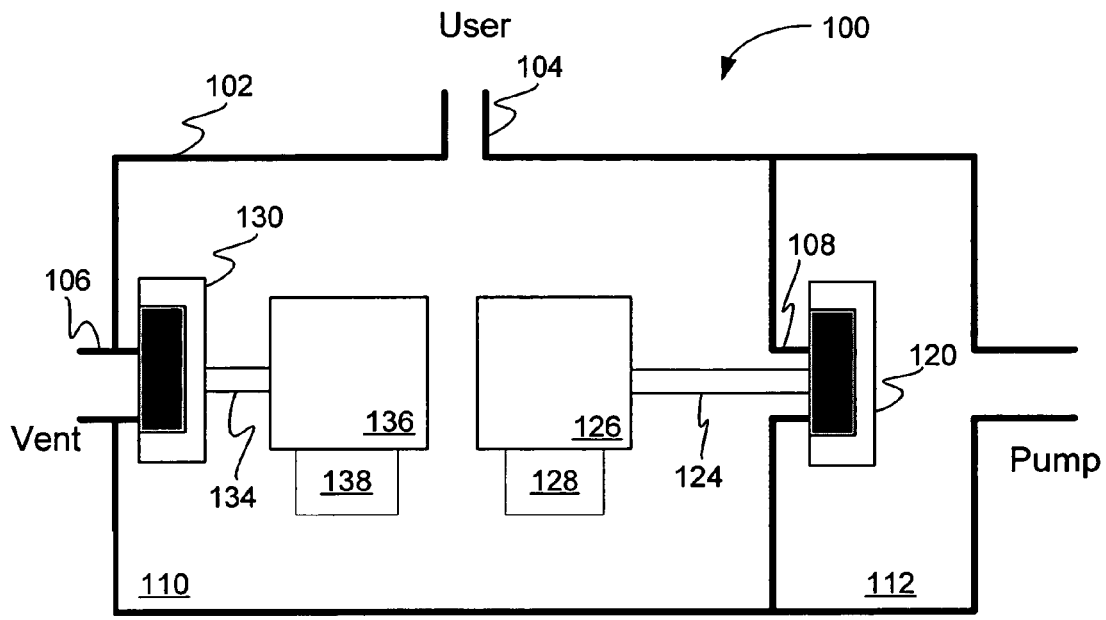
FIGS. 1A and 1B depict an exemplary valve system that includes a number of shape memory alloy ("SMA")-actuated valves for controlling the flow of fluids, according to one embodiment of the present invention.
Figure 1B:
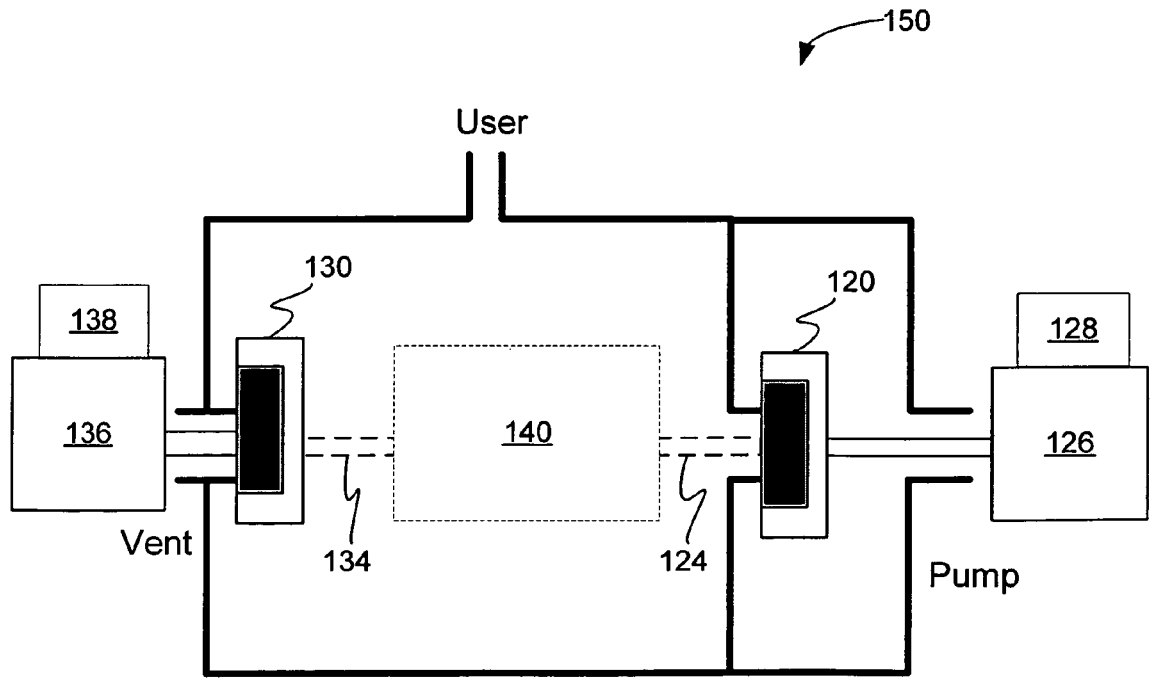

FIGS. 1A and 1B depict an exemplary valve system that includes a number of shape memory alloy ("SMA")-actuated valves for controlling the flow of fluids, according to one embodiment of the present invention. In the example shown in FIG. 1A, a system of SMA-actuated valves include a first SMA actuator 126 and a second SMA actuator 136 arranged in a "three-way, three-position" valve assembly 100, where each of first SMA actuator 126 and second SMA actuator 136 resides within valve assembly 100. Valve assembly 100 includes a housing 102 composed of a cavity 110 and a chamber 112. Also, housing 102 includes a first port 108 as an inlet port for enabling fluid flow from chamber 112 to cavity 110. Cavity 110 is generally closed to maintain a fluid without leakage (or at least negligible leakage), except for user port 104 and second port 106, both of which are outlet ports. SMA actuator 126 includes an output member 124 connected to a first seal 120 for closing and opening first seal 120 to vary fluid flow through first port 108. Similarly, a second SMA actuator 136 includes an output member 134 connected to a second seal 130 for closing and opening second seal 130 to vary fluid flow through second port 106. A "fluid," as used herein, generally refers to either a liquid or a gas, or both.

As a three-way, three-position valve, valve assembly 100 is in a normally closed valve state when first SMA actuator 126 and a second SMA actuator 136 are each in a state that presses first seal 120 and second seal 130 respectively against first port 108 and second port 106 to halt fluid flow. Consider that chamber 112 is a high-pressure chamber containing a relatively higher pressure fluid (denoted as "pump") when first SMA actuator 126 is in one or more other states. These other states include a "fully open" state as well as various other states of "partially open." Consider further that second port 106 is low-pressure ("vent") port venting to a lower pressure fluid chamber (not shown) when second SMA actuator 136 is operating in similar states as first SMA actuator 126. As such, valve assembly 100 can be in a first position (i.e., cavity 110 as a middle pressure port is isolated), in a second position (i.e., cavity 110 is pumping high pressure fluid from first port 108 into user port 104), and in a third position (i.e., cavity 110 is venting to a lower pressure via second port 106). As fluid being communicating from first port 108 to second port 106 can be at relatively high temperatures, a first temperature compensator 128 and a second temperature compensator 138 are included to minimize or negate the affects of temperature on either first SMA actuator 126 or second SMA actuator 136.

Generally, port pressures are arranged in the following sequence: Pvent<Puser<Ppump. As such, when first seal 120 and second seal 130 are closed, the pressure differentials in the system ensures that those seal 120, 130 are firmly pressed against their respective seats. In particular, pressure in first chamber 112 is greater than the pressure in cavity 110, which has a pressure greater than at vent port 106). If the initial pressure differential between ports is large enough, sufficient tightness of seals 120, 130 is possible without any supplementary springs or the like.

FIG. 1B depicts other arrangements of SMA actuators for implementing three-way, three-position valve assembly 100, according to various embodiments of the present invention. According to a specific embodiment, valve assembly 150 places first SMA actuator 126 and second SMA actuator 136 external to housing 102. In accordance with another specific embodiment, first SMA actuator 126 and second SMA actuator 136 are replaced with a single SMA actuator 140, such as a single bidirectional SMA actuator or single unidirectional SMA actuator, configured to control both first seal 120 and second seal 130 to control fluid flow through cavity 110. As will be discussed below, various embodiments of the present invention provide a variety of SMA actuators that can be used as either first SMA actuator 126 or second SMA actuator 136, or both. An ordinarily skilled artisan should appreciate that the SMA actuators that are subsequently described can be implemented in valve assemblies or valve systems other than as exemplified in FIGS. 1A and 1B. Also, most valves and valves systems described below can be designed to be either "normally open" or "normally closed" when the SMA elements are not powered. SMA-actuated valves as described below can operate in at least two states—open and closed. But generally, they also can operate in any number of states, such as in varying degrees of being "partially opened" to obtain variable flow rates.

FIG. 2A depicts a wire-based SMA actuator 200 suitable to implement either first SMA actuator 126 or second SMA actuator 136 of FIGS. 1A and 1B, according to an embodiment of the present invention. Wire-based SMA actuator 200 includes a plunger 201 having a first plunger end that includes a seal 208 and a plunger shaft 210. An SMA wire 202 has a first end coupled to a first anchor point 204 and a second end coupled to a second anchor point 206. A central portion of SMA wire 202 is coupled to plunger 201 at or near seal 208. First anchor point 204 and second anchor point 206 are affixed to a base 214, which generally has sufficient thermal stability to insure that critical wire anchor tolerances are maintained over a wide range of temperatures. In some cases, base 214 is a printed circuit board ("PCB") that provides support for wire-based actuator 200 and electrical connectivity for SMA wire 202 and for optional end of travel switches, if applicable. A restoring device 212 is configured to provide a restoring force to return seal 208 in a first direction (e.g., away from base 214) to a first position and to restore SMA wire 202 to a fully extended condition. As an example, restoring device 212 can be a coiled spring arranged coaxially about plunger shaft 210, where the coiled spring is a compression spring that contacts seal 208 or a plunger end at one spring end and contacts a base 214.

FIG. 2B depicts a wire-based SMA actuator 250 implementing a temperature compensator not used in wire-based SMA actuator 200, according to an embodiment of the present invention. Wire-based SMA actuator 250 includes elements of wire-based SMA actuator 200 of FIG. 2A and adds a second SMA wire 256 having a first wire end coupled to anchor point 252 and a second wire end coupled to another anchor point 254. A central portion of second SMA wire 256 is coupled to plunger 201 at or near its lower end (e.g., opposite the end having a seal). An optional guide 258 is formed as part of base 260 to guide plunger 201 as it translates between open and closed positions.

Second SMA wire 256 assists the spring in closing the plunger and can either be an "active" or "passive" wire. An active wire is powered electrically like first SMA wire 202. A passive wire is activated by relatively high ambient temperatures. But when second SMA wire 256 is implemented as a passive wire, second SMA wire 256 operates as a temperature compensating SMA wire to provide additional force when needed at high temperature. So by placing second SMA wire 256 counter to first SMA wire 202, this eliminates the tendency of first SMA wire 202 to overcome the spring force of restoring device 212, which prevents seal 208 from reaching its first position at high temperatures. In some cases, the transition temperature of second SMA wire 256 is selected to be lower than that of first SMA wire 202 to insure the effect occurs at a desired temperature. So by adding second SMA wire 256 to wire-based SMA actuator 200, the useful life or longevity in operating a valve can be increased. Although FIG. 2B shows SMA wires 256 and 202 crossing each other, they are designed to maintain electrical isolation from each other so as not to create an unintentional short circuit path. To this end, SMA wires 256 and 202 might be offset out of the plane of the actuator or one of the wires might include an insulating coating over the portion of greatest proximity to the other wire.

FIG. 2C illustrates exemplary operation of wire-based SMA actuator 200 in accordance with a specific embodiment of the present invention. As shown, wire-based SMA actuator 200 is disposed in a housing 238 having an inlet port 230 and an outlet port 234. Initially, consider that SMA wire 202 is not powered and is fully extended by restoring device 212. In this position, seal 208 is firmly pressed against the seat of a port 230 to prevent fluid flow. To open port 230, wire-based SMA actuator 200 operates to power SMA wire 202 by applying an electrical voltage to the wire ends via, for example, electrical traces (not shown) on base 214. In turn, SMA wire 202 generates contraction forces that create a linear force that tends to pull plunger 201 and its seal 208 away from an orifice, thereby opening port 230 and allowing fluid flow out from an outlet port 234. In operation, activated SMA wire 202 creates a linear force that overcomes the spring force of restoring device 212 (not shown), then seal 208 opens the port as plunger 201 and its end are displaced in a second direction (e.g., toward base 214). Note that in this configuration, SMA 202 forms a "wide inverted V" where the wide angle is chosen to provide significant stroke multiplication to the central point of the "V," or the central portion of SMA 202, which is attached to plunger 201. This insures that SMA wire 202 contracts less for a given plunger stroke than for a "narrower inverted V." As such, the cyclic life of SMA wire 202 is prolonged.

FIG. 2C also shows an optional shut-off switch 232 configured to receive a lower plunger end (i.e., a second plunger end) when plunger 201 reaches a second position (e.g., fully open). Switch 232 can operate as an end of travel switch configured to remove power from said SMA wire.

As shown in FIGS. 3A and 3B, switch 232 can be a simple leaf spring anchored at one side on the underside of base 214. FIG. 3A shows switch 232 in a closed position, thereby allowing first SMA wire 202 to be powered. But FIG. 3B shows switch 232 in an open position, where power is cut until the contact of switch 232 is restored. FIG. 3C is alternate shut-off switch 270. Switch 270 includes a collapsible dome or contact 280 connected to lower or second plunger end 282. When plunger 201 reaches a second position (e.g., fully open), then collapsible contact 280 collapses onto another contact 284 to thereby close a circuit formed on base 214 (not shown) to cause power to be removed from first SMA wire 202.

Note that a "stroke multiplying" SMA actuator, such as wire-based SMA actuator 202, is an SMA actuator in which the stroke of the actuator is greater than the contraction or extension of SMA wire 202. The "stroke" of an SMA actuator is generally the change in distance between the fully extended length and the fully contracted length of the actuator. In general, stroke-multiplication in SMA actuators is accompanied by a proportional reduction in their output force. Although no additional work can be created by this means, the tangible benefit is the improved matching between the stroke and force required compared to the stroke and force available. In this case, the benefit is made possible by the excess of traction force available from the SMA wire along its length, compared to the seating forces needed for a good valve seal.

Also note that SMA wire 202 can be composed of one or more SMA elements. An SMA "element" refers to an SMA material of elongate form, capable of contraction and elongation along the longitudinal axis. The element may have a circular cross-section, as is the case for an SMA wire, or any of a variety of cross-sections such as elliptical, square, rectangular, or the like. Shape memory alloy ("SMA") refers to metals, which exhibit two very unique properties, pseudo-elasticity, and the shape memory effect. Pseudo-elasticity refers to the almost rubber-like flexibility of SMAs. The shape memory effect refers to the unique ability of shape memory alloys to be severely deformed and then returned to their original shape simply by heating them. By way of example and not limitation, shape memory alloys include NiTi (Nickel-Titanium), CuZnAl, and CuAlNi among others. Although other means are known in the art, heating is commonly accomplished by passing an electric current through the wire. For purposes of concreteness, the description of the present invention invokes mainly electric, or ohmic heating of the SMA wire.

Figure 4A:
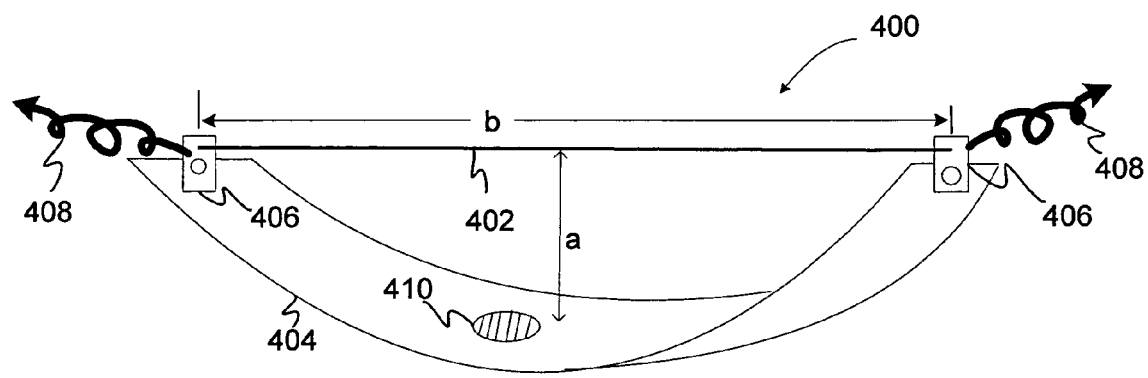
FIGS. 4A to 4G depict another wire-based SMA actuator suitable to implement SMA actuators of FIGS. 1A and 1B, according to one embodiment of the present invention.

FIGS. 4A to 4G depict another wire-based SMA actuator 400 suitable to implement either first SMA actuator 126 or a second SMA actuator 136 of FIGS. 1A and 1B, according to an embodiment of the present invention. FIG. 4A shows that a wire-based SMA actuator 400 includes an SMA wire 402 coupled between anchor points 406 on a leaf spring 404. Anchor points 406 attach SMA wire 402 between ends of leaf spring 404 and electrically isolate SMA wire 402 from leaf spring 404. Power is applied via conductors 408 to the ends of SMA wire 402 from a power supply (not shown). Leaf spring 404 is configured to provide a restoring force to return SMA wire 402 to an extended condition and is also configured to bend as SMA wire 402 contracts. In some cases, leaf spring 404 includes a spring hole 410 to enable a second end of a plunger to pass through and couple to leaf spring 404. Wire-based SMA actuator 400 operates in at least two states (i.e., open and closed), but like other SMA-actuated valves described herein it can operate in any number of states. In one state, SMA wire 402 is not powered and leaf spring 404 is at an initial length, b, and at an initial height, a, above the center of leaf spring 404. In other states, power is applied to SMA wire 402 to generate contraction forces, which pulls anchor points 406 closer together in distance. Consequently, leaf spring 404 increasingly bends as power is increasingly applied to SMA wire 402 such that length, b, decreases in magnitude and height, a, increases in magnitude. Advantageously, wire-based SMA actuator 400 has a force profile that decreases as SMA wire 402 contracts. As such, increasingly lower contraction forces are required for progressive movements of a plunger.

Figure 4B:
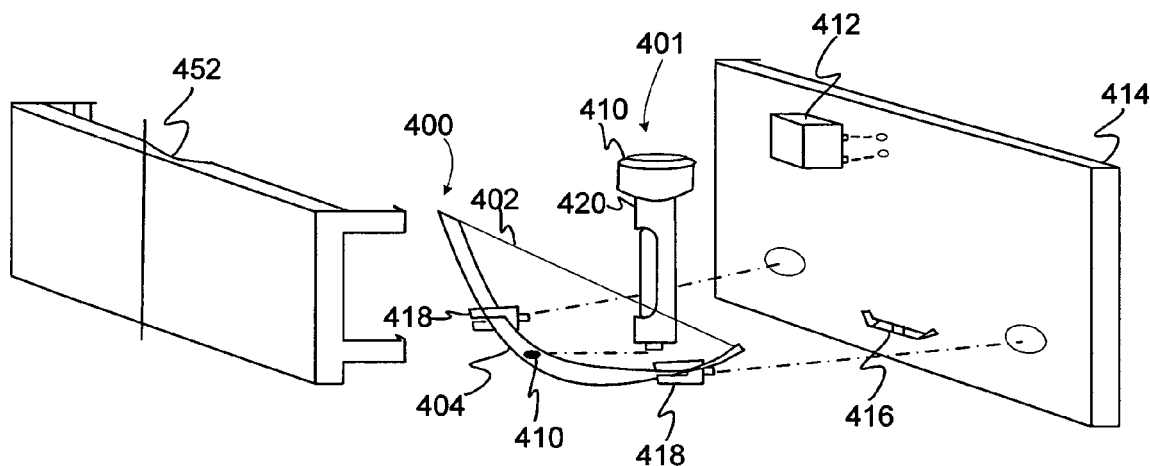
Figure 4C:
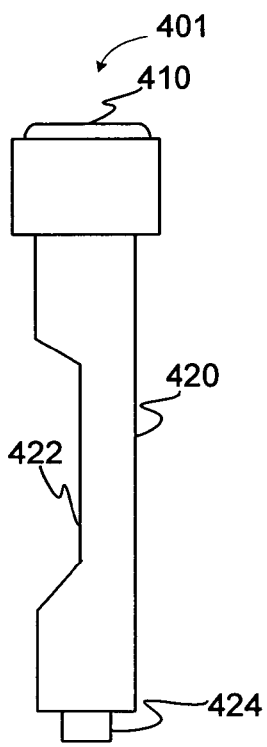

FIG. 4B is an exploded view of an exemplary wire-based SMA-actuated valve 450 according to an embodiment of the present invention. Wire-based SMA-actuated valve 450 includes at least a plunger 401, wire-based SMA actuator 400, and a base 414. Plunger 401 includes a seal 410 at a one end, a plunger shaft 420 and a second plunger end 424. FIG. 4C shows an example of plunger shaft 420 having a notch 422 for permitting SMA wire 402 to pass between anchor points 406 without interfering with plunger shaft 420. Further, second plunger end 424 is configured to couple to leaf spring 404 by interlocking with spring hole 410. As such, second plunger end 424 is configured to move in tandem with spring hole 410 as leaf spring 404, for example, bends under contraction of SMA wire 402, where bending of leaf spring 404 at near or spring hole 410 is referred to as a curvature point.

Figure 4D:
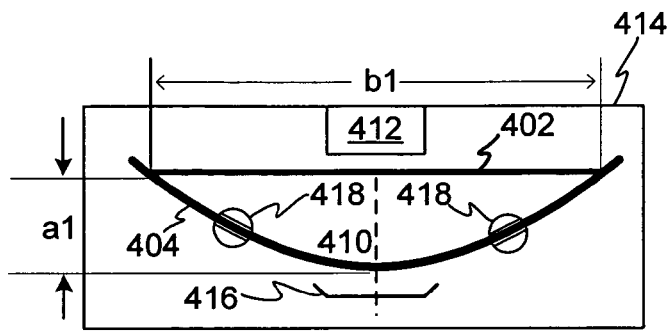
Figure 4E:
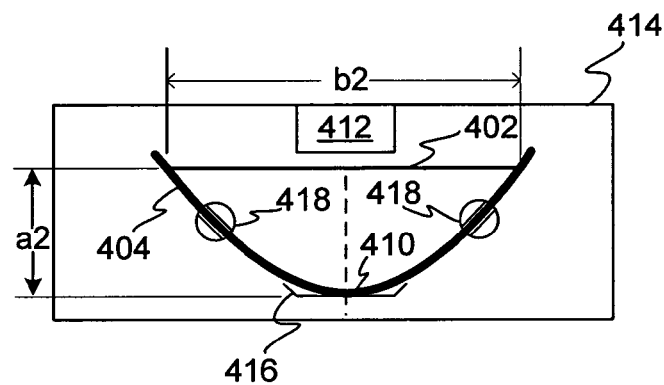
Figure 4F:
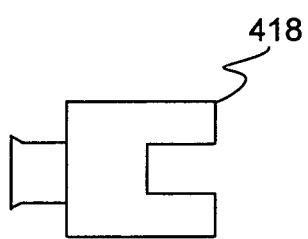
Figure 4G:
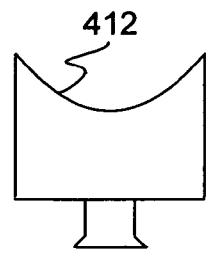

Base 414 includes a guide 412 to support and guide plunger 401 as it moves to variably control fluid-flow and includes an end of travel switch 416 for detecting when wire-based SMA-actuated valve 450 reaches a second position (e.g., fully open) at which power to SMA wire 402 is cut off. Cover 452 provides additional support for plunger 401 and keeps leaf spring 404 mounted to base 414. Base 414 also includes mounting fixtures 418 for anchoring the combination of wire-based SMA actuator 400 and plunger 401 to operate as a valve. Each mounting fixture 418 allows leaf spring 404 to slide, bend and rotate so that plunger 401 can retract into a second position. In particular, as height, a, increases due to contraction forces generated by SMA wire 402, spring hole 410 and second plunger end 424 move toward end of travel switch 416. FIGS. 4D and 4E illustrate the basis for this movement as leaf spring 404 bends within mounting fixtures 418. In FIG. 4D, SMA wire 402 is unpowered. Here, height, a1, and length, b1, are as is shown. In the unpowered state, seal 410 would come to rest against a valve seat with a predictable force. It may also be convenient to provide the base with motion limiting features such that the ends of leaf spring cannot 404 extend to stretch SMA wire 402 beyond safe limits. In FIG. 4E, power is applied to SMA wire 402. As SMA wire 402 contracts, mounting fixtures 418 are configured to direct increases in height toward end of travel switch 416. For example, when height increase to a2 from a1, and length shortens to b2 from b1, then second plunger end 424 as well as spring hole 410 engages a contact at end of travel switch 416, thereby causing power to be removed. In one embodiment, leaf spring 404 serves as one of the contacts for end of travel switch 416. Therefore, end of travel switch 416 can be replaced with just a second contact. End of travel switch 416 then can be located at a position other than on base 414. End of travel switches are well known and need not be detailed in this discussion. FIGS. 4F and 4G depict side views of an exemplary mounting fixture 418 and a guide 412, respectively.

Figure 5A:
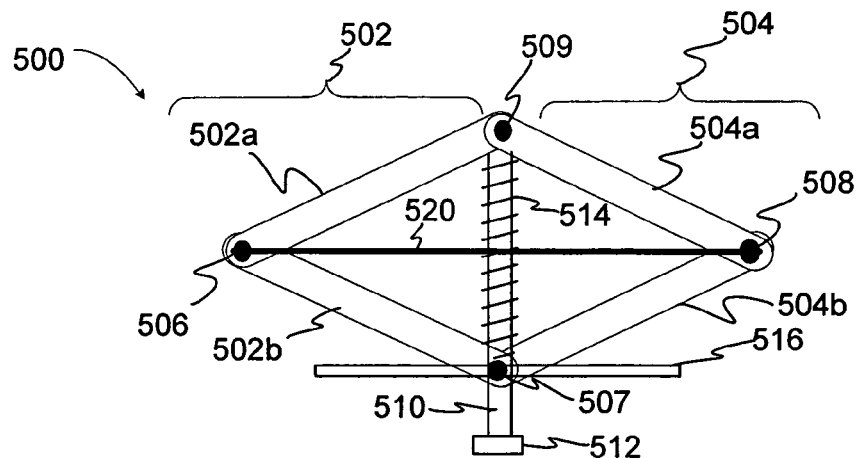
FIGS. 5A to 5C depict other wire-based SMA actuators suitable to implement SMA actuators of FIGS. 1A and 1B, according to other embodiments of the present invention.
Figure 5B:
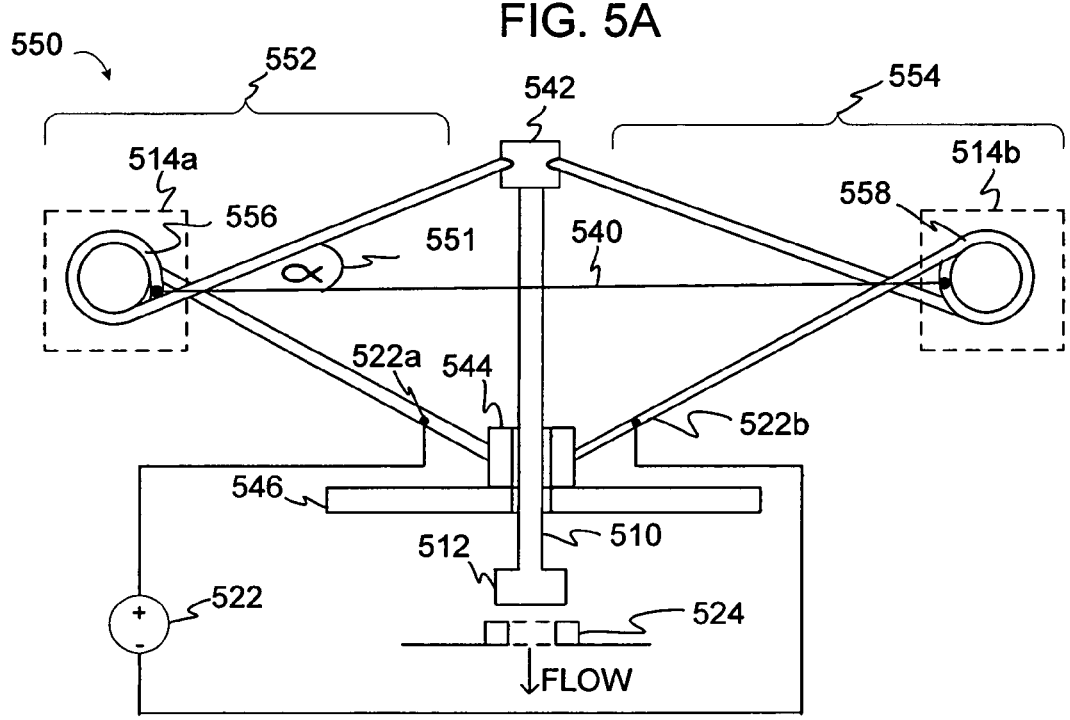
Figure 5C:
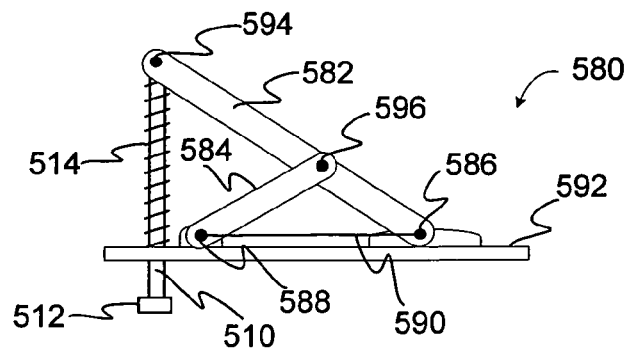

FIGS. 5A to 5C depict other wire-based SMA actuators suitable to implement either first SMA actuator 126 or a second SMA actuator 136 of FIGS. 1A and 1B, according to other embodiments of the present invention. In FIG. 5A, wire-based SMA-actuated valve 500 includes a first linkage 502, a second linkage 504, a plunger 510, a base 516, an SMA wire 520 and a restoring device 514. First linkage 502 has a first member 502a pivotally coupled to a first attachment point 509 at one end and a first joint 506 at the other end, and a second member 502b having a first end pivotally coupled to first joint 506 and a second end pivotally coupled to anchor point 507. Similarly, second linkage 504 has a first member 504a being pivotally coupled to a second joint 508 at one end and being pivotally coupled to a second attachment point 509, which in this case is the same as first attachment point 509. Second linkage 504 also has a second member 504b having a first end pivotally coupled to second joint 508 and a second end pivotally coupled to a second anchor point 507, which in this case is the same as first anchor point 507.

Base 516 provides a mounting for first and second anchor points 507 so that these anchor points remain fixed relative to base 516 whereas first and second attachment points 509 are free to move relative to base 516. Plunger 510 includes a seal 512 at a first end and a shaft extending to a second end, which is coupled to first and second attachment point 509. Restoring device 514 in this case is a coiled spring arranged coaxially about the shaft and is configured to provide a restoring force to return plunger 510 in a first direction to a first position (e.g., either open or closed) and to restore SMA wire 520 to a fully extended condition. SMA wire 520 has a first end coupled to first joint 506 and a second end coupled to second joint 508.

In operation, SMA wire 520 generates contraction forces when power is applied thereto. These contraction forces cause first joint 506 and second joint 508 to move closer in distance. And as first and second anchor points 507 are affixed to base 516, first and second attachment points 509 move in a direction away from base 516. This movement applies a linear force to the second end of plunger 510. And when this linear force is greater than the restoring force of spring 514, there is displacement of the first plunger end and seal 512 in a second direction.

FIG. 5B illustrates another wire-based SMA-actuated valve 550 in accordance to a specific embodiment of the present invention. Wire-based SMA-actuated valve 550 includes a first linkage 552, a second linkage 554, a plunger 510, a base 546, an SMA wire 540 and restoring devices 514a and 514b as a restoring device. First linkage 552 can be a single rod-like member having a torsion spring formed as a first joint 556. Similarly, second linkage 554 can also be a single rod-like member having another torsion spring formed as a second joint 558. First joint 556 and second joint 558 are restoring device 514a and 514b, both of which are configured to provide a restoring force to return plunger 510 in a first direction to a first position (e.g., either open or closed) and to restore SMA wire 540 to a fully extended condition. One end of each of first linkage 556 and second linkage 558 is coupled to an insulating cap 542, which is attached to the second plunger end of plunger 510, and the other end of each linkage is coupled to an insulating collar 544. Insulting collar 544 has a passage for the shaft of plunger 510 to pass through. Base 546 is configured to affix insulating collar 544 upon a surface so that although insulating collar 544 does not move relative to base 546, insulating cap 542 can move with respect to base 546. SMA wire 540 has a first end coupled to first joint 556 and a second end coupled to second joint 558, where first joint 556 and second joint 558 are coupled to a first power terminal 522a and a second power terminal 522b, respectively, of a power supply 522.

In operation, seat 512 of plunger 510 firmly presses against a seat 524 of a port when SMA wire 540 is unpowered and has been restored to that position (e.g., the "first position"). But when wire-based SMA-actuated valve 550 is activated to open up the port, power supply 522 applies power to terminals 522a and 522b. As their names imply, insulating cap 542 and insulating collar 544 are insulators and do not conduct electricity, but first linkage 552 and second linkage 554 are configured to be conductive. As such, SMA wire 540 receives power and generates contraction forces. These contraction forces result in a linear force applied to plunger 510 at insulating cap 542. This linear force eventually overcomes the restoring forces provided by torsion springs at first joint 556 and second joint 558 and causes plunger 510 to move in an opposite direction to a second position (e.g., the "second position") such that seal 512 moves away from seat 524, thereby opening the port. Once power is removed, restoring devices 514a and 514b extend SMA wire 540 and return seal 512 in contact with seat 524.

In some instances, torsion springs constituting restoring devices 514a and 514b are designed to provide a predetermined "seat force" or preload when no power is applied. Angle 551 in practice is selected to be relatively small, although this requires SMA wire 540 to generate large contraction forces initially. But as angle 551 increases, less contraction forces (e.g. by a factor of 1/tan (angle 551)) are required to move plunger 510 in a second direction. This required force profile, which decreases with increase in angle 551, is termed "degressive" and is beneficial for improving longevity and reliability of wire-base actuator 550. Also, as SMA wire 540 remains straight during actuation, reliability is further improved.

FIG. 5C illustrates yet another wire-based SMA-actuated valve 580 in accordance with a specific embodiment of the present invention. Wire-based SMA-actuated valve 580 includes a first linkage 582, a second linkage 584, a plunger 510, a base 592, an SMA wire 590 and a restoring device 514. In this case, base 592 includes a slideable mount 586 and a base anchor point 588. Slideable mount 586 is configured to slide across the surface of base 592 toward base anchor point, which is rigidly affixed to base 592.

First linkage 582 has a first anchor point pivotally coupled to slideable mount 586 and an attachment point 594 pivotally coupled to a second end of plunger 510, whereby first linkage 582 is configured to impart a linear force onto plunger 510. First linkage 582 also includes a fulcrum point 596 serving a fulcrum for operating wire-based SMA-actuated valve 580. Second linkage 584 has a second anchor point pivotally coupled to base anchor point 588. Further, second linkage 584 is also pivotally coupled to fulcrum point 596 at its other end. As shown, second linkage 584 is shorter in length than first linkage 582. In this instance, restoring device 514 is a coiled compression spring for restoring SMA wire 590 back to an extended position and for placing seal 512 back to a first position. Wire-based SMA-actuated valve 580 operates in a similar fashion as those described above in that when SMA wire 590 is powered. Contraction forces generated by SMA wire 590 causes slideable mount 586 to slide closer to base anchor point 588, which cause attachment point 594 to impart a linear force onto plunger 510, thereby moving seal 512 from its first position.

Figure 6A:
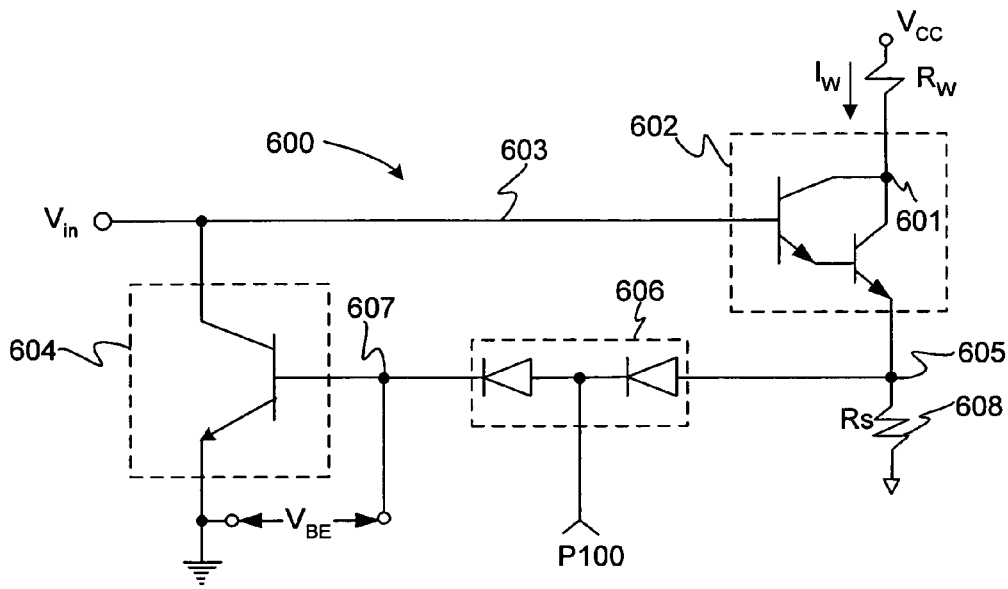
FIGS. 6A to 6C depict another temperature compensator and its performance characteristics, which may be used in accordance with at least one embodiment of the present invention.

FIG. 6A is a schematic showing a temperature compensator for maintaining the appropriate level of power applied to the SMA actuator, according to a specific embodiment of the present invention. Temperature-compensated driver circuit 600 is configured to apply the appropriate power to drive one or more SMA elements of an SMA-actuated valve with little or no affect by excursions in ambient temperature into relatively high temperature ranges. Exemplary power requirements to generate uniform contraction forces by an SMA element for various ambient temperatures are shown in Table I.

TABLE I

| Temp (ambient) in Celsius | Power in Watts |
|---|---|
| −40 C. | ~1.5 W |
| +27 C. | ~1 W |
| +80 C. | ~0.55 W |

To increase reliability and longevity of SMA elements and actuators, temperature-compensated driver circuit 600 is configured to deliver temperature compensated power that is especially tuned for driving SMA elements.

Figure 6B:
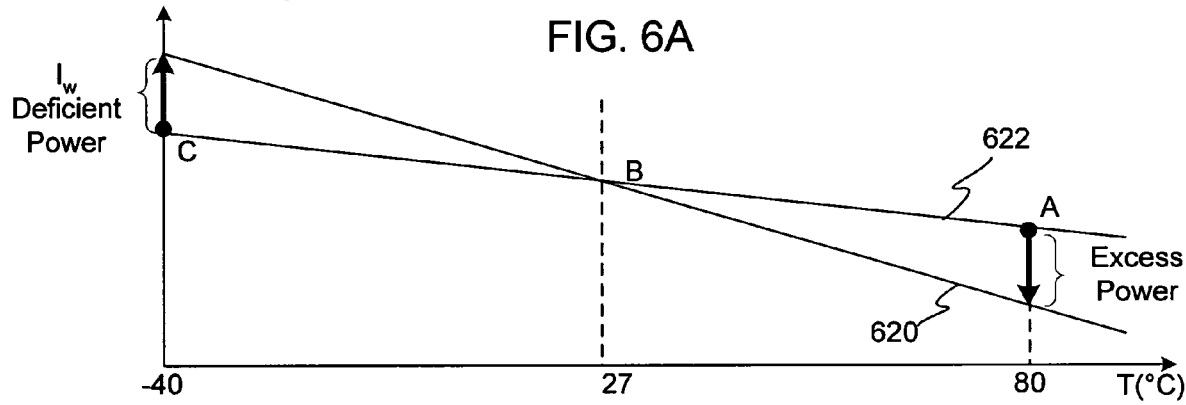

FIG. 6B shows a current requirement relationship 620 to sufficiently operate SMA elements over temperature, with applied power being dependent on current, Iw. In particular, current requirement relationship 620 expresses the relationship between ambient temperature and power required shown in Table I. But in normal drivers of SMA elements, the current actually generated by conventional driver circuits is shown as relationship 622, even though those conventional drivers typically include current limiting circuitry. Relationship 622 indicates that a typical driver circuit delivers current as a function of temperature. In particular, at −40° C. the driver delivers less current (and thus less power) than SMA elements require to function properly. And as ambient temperature increases from room temperature (i.e., +27° C.) to +80° C., the driver tends to deliver excess current (and thus excess power) than SMA elements require to operate sufficiently. According to an embodiment of the present invention, temperature-compensated driver circuit 600 is configured to close the gaps indicated as "deficient power" and "excess power" shown in FIG. 6B.

Figure 6C:
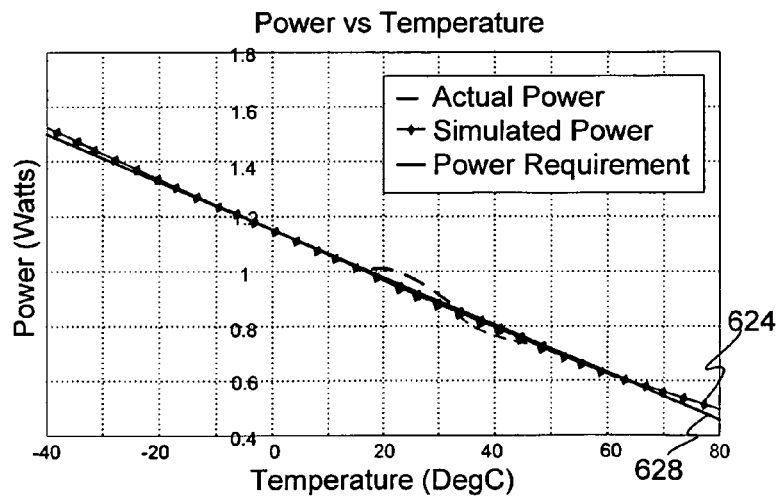

Referring back to FIG. 6A, temperature-compensated driver circuit 600 includes a Darlington Pair ("DP") of bipolar junction transistors ("BJTs") 602, the collector terminal 601 of which is connected to an SMA element, which is depicted as a wire resistance, Rw. The other end of the SMA element is coupled to a power supply source, such as voltage Vcc. Emitter terminal 605 of DP is coupled to a current sensing resistance ("Rs") 608. Rs 608 is placed in series with the load (i.e., the SMA element) to develop a voltage at terminal 605 that is proportional to current Iw, which passes through the SMA element. Diode pair 606 has an input terminal coupled to terminal 605 and an output terminal coupled to an input 607 into a current-limiting BJT 604. The diodes in diode pair 606 are selected according to their variation in their output voltage with temperature. As such, diode pair 606 operates to vary the current-limiting capabilities of BJT 604 more closely to ambient temperature. FIG. 6C shows a simulated relationship 624 for temperature-compensated driver circuit 600 of FIG. 6A that more closely matches the power 628 required by SMA elements as temperature increases. Therefore, temperature-compensated driver circuit 600 reduces excess power at high temperatures, thereby increasing the reliability of SMA-actuated valves of various embodiments of the present invention. In some embodiments, diode pair 606 includes a shut-down input ("P100") to shut down current passage through Rw to, prevent overheating, such as when an end of travel condition of a plunger is reached. In a specific embodiment, temperature-compensated driver circuit 600 is second temperature compensator 138 of FIG. 1

Figure 7A:
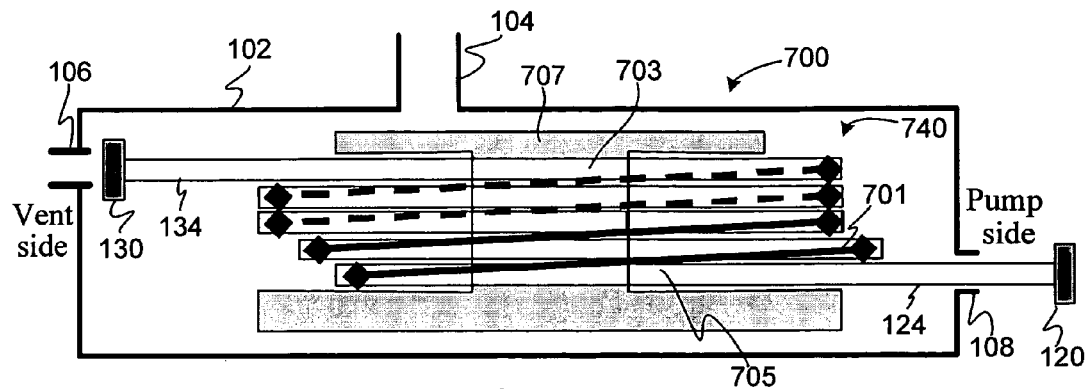
FIGS. 7A to 7D illustrate a SMA-actuated valve using a unidirectional SMA actuator configured to control both a first seal and a second seal, according to one embodiment of the present invention.

FIGS. 7A to 7D illustrate an exemplary SMA actuator 140 that is configured to control both first seal 120 and second seal 130, according to one embodiment of the present invention. FIG. 7A shows valve assembly 700 to include elements having similar structure and functionality as those described in FIGS. 1A and 1B. But in this example of SMA actuator 140, a single unidirectional SMA actuator 740 is implemented to control fluid flow in valve assembly 700. In this case, unidirectional SMA actuator 740 is disposed in housing 102, which has a pump port 108 as a first port, vent port 106 as a second port and a user port 104 as a third port. The term "unidirectional," as used herein, is used to signify that an SMA actuator is used to produce motion in only one direction, with the opposite direction being produced by some other non-SMA means, such as springs. But note A dual output SMA actuator is an actuator having two actuated output members 124, 134 that are independently operable rather than being dependent on the operation of the other.

Unidirectional SMA actuator 740 is shown having an output member 134 extending to a second seal 130 and an output member 124 extending to a first seal 120. In particular, it includes at least three rigid parallel elongate members supported by a support 707, which can be rigidly attached to housing 102. Each elongate member has a long axis and being slideable relative to one another parallel to that long axis. Each member is connected one to another by an SMA wire 701 such that the stroke of unidirectional SMA actuator 740 is substantially equal to the sum of the stroke of the SMA wires. A top member 703 of unidirectional SMA actuator 740 is connected to output member 134 and a bottom member 705 is connected to output member 134. In accordance with a specific embodiment of the present invention, SMA actuator 740 of FIG. 7A (or in FIGS. 7B to 7D) can be fabricated by extending the actuator concepts disclosed in U.S. Pat. No. 6,574,958 having a title "Shape Memory Alloy Actuators and Control Methods," which is incorporated herein by reference in its entirety. That patent was filed on Aug. 11, 2000 and is assigned to NanoMuscle, Inc.

Figure 7B:
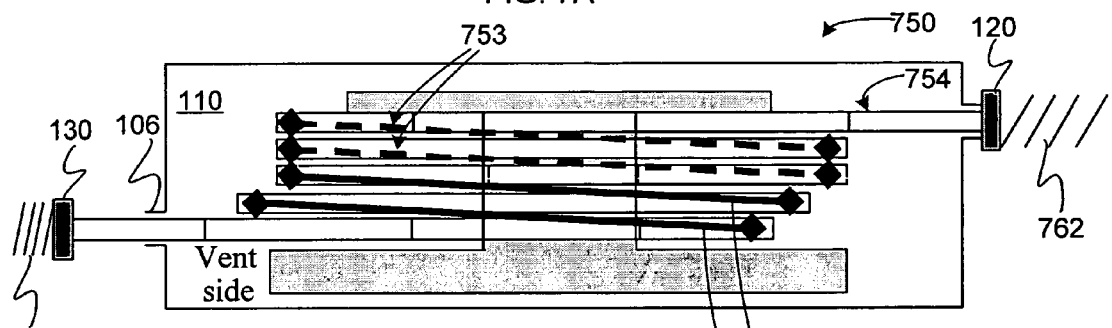
Figure 7C:
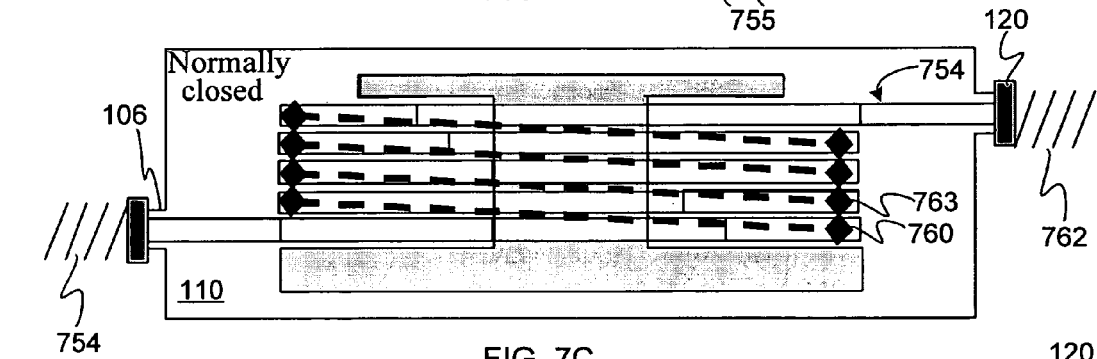
Figure 7D:
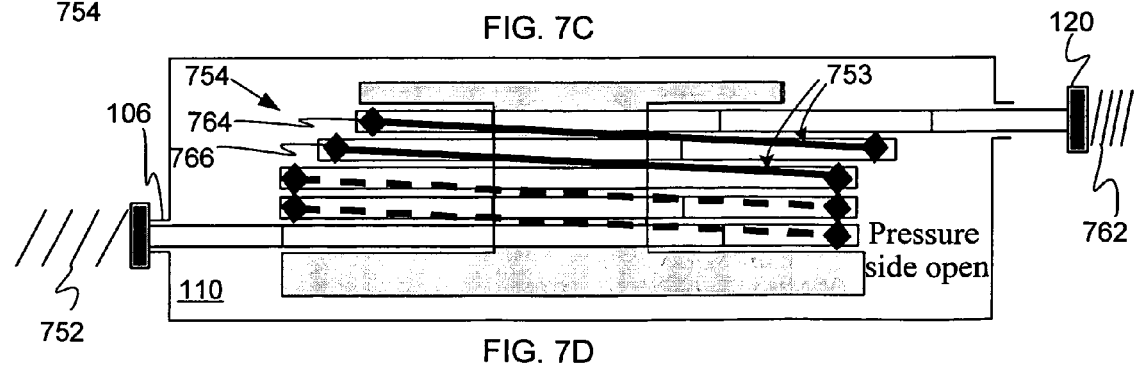

FIG. 7B shows another valve assembly 750 including elements having similar structure and functionality as those described in FIGS. 1A and 1B, according to another specific embodiment of the present invention. But in this example, unidirectional SMA actuator 754 uses second seal 130, as the vent seal, external to cavity 110. Also, valve assembly 750 includes bias springs 752 and 762 to provide restoring forces to return first seal 120 and second seal 130, respectively, to a normally closed position. The addition of sufficient spring bias stress in valve assembly 750 increases the transformation temperature of SMA wires for unidirectional SMA actuator 754 to a value larger than the largest ambient temperature likely to be encountered. The SMA wires of unidirectional SMA actuator 754 are grouped into two zones such that the SMA wires are powered according to which zone they belong. As shown in FIGS. 7B to 7D, unidirectional SMA actuator 754 includes four wire strands: two in a top zone and two in a bottom zone. In particular, top zone wires 753 power first seal 120 on the pressure side, while bottom zone wires 755 power second seal 130 on the vent side. Further, in FIGS. 7B to 7D, unpowered wires are shown as dashed lines and powered wires are shown as solid lines.

FIG. 7B shows that bottom zone wires 755 are powered and top zone wires 753 are unpowered. As such, second seal 130 extends out from housing 102 to open vent port 106 and to compress bias spring 752. FIG. 7C shows that when power is removed from bottom zone wires 755, those wires retract back under a restoring force provided by bias spring 754 to close second seal 106. The bottom two planes slide to the right and bottom-most output member 760 slides twice as far back to its original, unpowered position than its neighbor member 763. In FIG. 7C, both seals are closed. Next, FIG. 7D shows top zone wires 753 being powered while bottom zone wires 755 remain unpowered. Powering top zone wires 753 results in first seal 120 opening and extending to compress bias spring 762, thereby storing restoring forces to close first seal 120 when power is removed from top zone wires 753. As top zone wires 753 are powered, the top two members slide to the right, with topmost output member 764 sliding twice as far as its neighbor member 766.

Figure 8A:
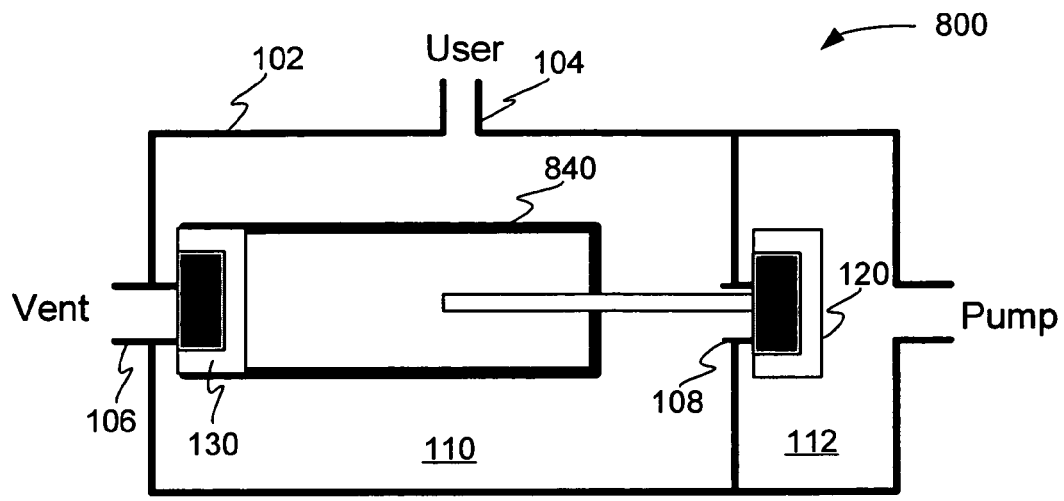
FIGS. 8A to 8D illustrate a SMA-actuated valve using a bidirectional SMA actuator configured to control both a first seal and a second seal, according to one embodiment of the present invention.
Figure 8B:
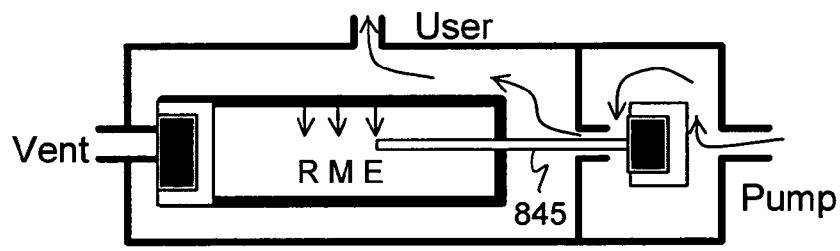
Figure 8C:
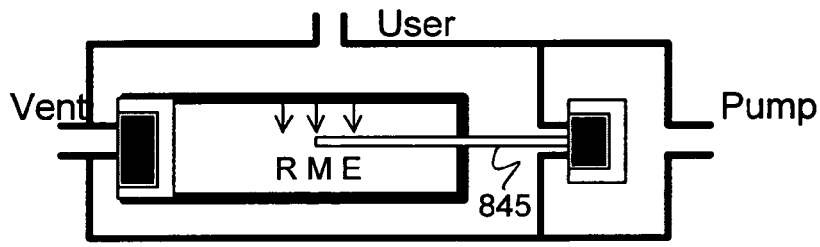
Figure 8D:
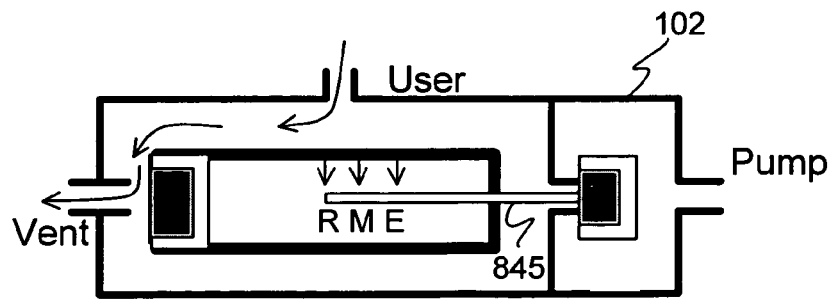

FIGS. 8A to 8D illustrate another exemplary SMA actuator 140 that is configured to control both first seal 120 and second seal 130, according to one embodiment of the present invention. FIG. 8A shows valve assembly 800 including elements having similar structure and functionality as those described in FIGS. 1A and 1B. But in this example of SMA actuator 140, a single bidirectional SMA actuator 840 is implemented to control fluid flow in valve assembly 800. Bidirectional SMA actuator 840 is shown having a second seal 130 embedded or formed as part of the case of bidirectional SMA actuator 840. In some embodiments, bidirectional SMA actuator 840 is disposed within, but not rigidly affixed to, housing 102. This means that bidirectional SMA actuator 840 is free to move linearly in housing 102 along a mechanical guide (not shown). As is depicted in FIGS. 8B to 8D, single bidirectional SMA actuator 840 operates in three positions: (1.) an extended position ("E"), (2.) a middle ("M") position, and (3.) a retracted ("R") position, each position symbolically indicated in respective FIGS. 8B, 8C, and 8D by those same letters located near one end of output member 845.

FIG. 8B depicts bidirectional SMA actuator 840 operating in an extended position ("E"). First, a user or some other automated control system commands that valve assembly 800 communicate pressurized fluid to user port 104. In response to the command, bidirectional SMA actuator 840 extends an output member 845, and correspondingly, a second seal 120 attached thereto. With second seal 130 being firmly pressed over vent port 106, a reaction force therefrom helps to move first seal 120 off its seat thereby admitting pressurized fluid into cavity 110. The force necessary to open this seal is greatest at the beginning of this action when the static pressure on the other side of the seal must be overcome. But once the flow is established, the pressure differential drops and continuing movement of the seal becomes easier. So the force profile for bidirectional SMA actuator 840 is degressive. Locating first seal 120 in first chamber 112 of the pressurized side is beneficial for any SMA actuation means since it facilitates a tight seal to be achieved in the normally closed or power-off condition, such as in the middle position shown in FIG. 8C.

In various alternate embodiments of the present invention, bidirectional SMA actuator 840 can be controlled by position-sensing means, by end of travel positioning and/or by Pulse Width Modulation ("PWM"). With the implementation of position-sensing means (e.g., a variable resistance proportional to distance traveled, or current position), flow control of valve assembly 800 can be achieved by commanding bidirectional SMA actuator 840 to advance up to the next incremental stroke position. Also, an elementary actuation command can urge bidirectional SMA actuator 840 to advance to its end of travel position, which is determined when a switch senses that a seal is fully open and then switches off power to bidirectional SMA actuator 840. Further, flow control may still be achieved by using PWM techniques by varying the fraction of time the device is powered.

If a user wishes to achieve a pressure lower at user port 104 than that of pump port 108, first seal 120 can be closed while vent port 106 remains closed. This can be achieved simply by turning off the power to bidirectional SMA actuator 840 and allowing the remaining dynamic pressure differential between first chamber 112 and cavity 110 to close first seal 120 on its own. This is a likely scenario since a user's ability to control pressure is best served if a fluid source has at least some excess pressure. This facilitates control by allowing a reasonable flow rate to persist up to the completion of a user's activities. But if the user wishes to close first seal 120 after the flow has diminished to a point that first seal 120 cannot close on its own with pressure from first chamber 112, then bidirectional SMA actuator 840 can be operated to reverse direction until an optional internal switch (not shown) corresponding to the middle position is tripped.

FIG. 8C depicts bidirectional SMA actuator 840 operating in a middle position ("M"). Valve assembly 800 is in its off state and bidirectional SMA actuator 840 is relaxed. Both movable seals, first seal 120 and second seal 130, are closed and pressed against their respective seats by the pressure differentials in the system (i.e., pressure in first chamber 112 is greater than the pressure in cavity 110, which has a pressure greater than at vent port 106). If the initial pressure differential between ports is large enough, sufficient tightness is possible without any supplementary springs or the like.

FIG. 8D depicts bidirectional SMA actuator 840 operating in a retracted position ("R") in which first seal 120 is closed while second seal 130 is open. Valve assembly 800 brings vent port 106 into fluid communication with user port 104 by commanding bidirectional SMA actuator 840 to retract its output member 845. Since first seal 120 contacts its seat before bidirectional SMA actuator 840 has reached its retracted position, R, any further effort by bidirectional SMA actuator 840 to retract causes housing 102 of bidirectional SMA actuator 840 to move (i.e., to be pulled) toward first seal 120. Second seal 130, as the vent seal rigidly joined to housing 102, then lifts off its seat to open vent port 106. As with the extension position of FIG. 8B, controlled vent flow of FIG. 8D can be effected in an analog way by using a position sensor to provide retraction feedback to a controller, or in a digital way using PWM, for example.

Figure 9A:
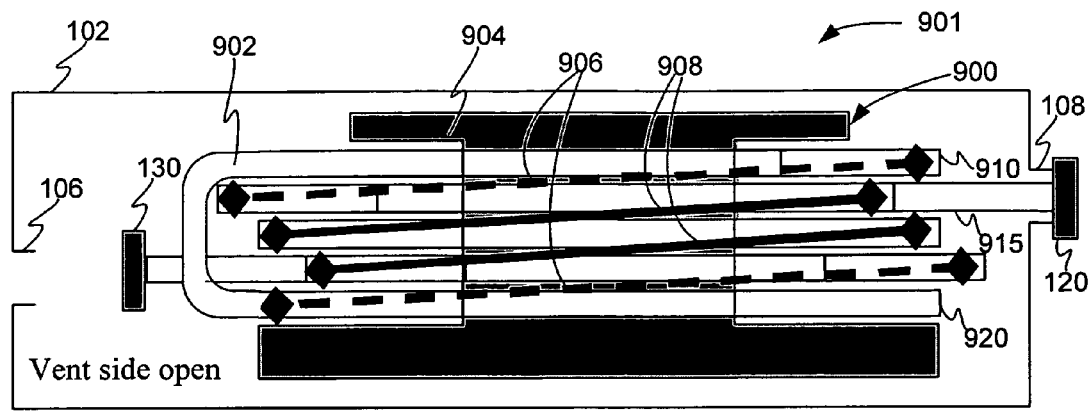
FIGS. 9A to 9C illustrate an exemplary bidirectional SMA actuator, according to one embodiment of the present invention.
Figure 9B:
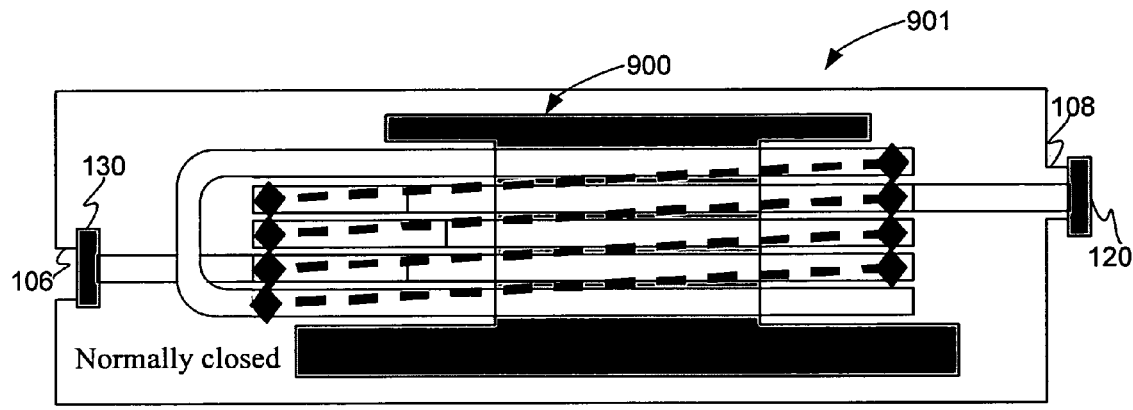
Figure 9C:
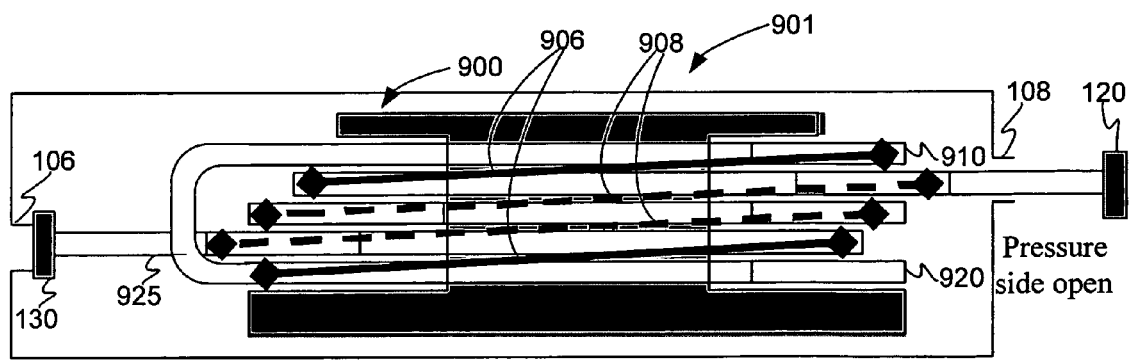

FIGS. 9A to 9C illustrate an exemplary bidirectional SMA actuator, according to one embodiment of the present invention. FIG. 9A shows bidirectional SMA actuator 900, which is suitable to implement bidirectional SMA actuator 840 of FIGS. 8A to 8D. In this example, bidirectional SMA actuator 900 is disposed in housing 102 with a second port 106 as a vent port and a first port 108 as a pump port. User port 104 is not shown for purposes of this discussion. Bidirectional SMA actuator 900 includes a case 904 configured to electrically isolate actuation members therein and mechanically guide those members. Unlike unidirectional SMA actuator 740 of FIGS. 7B to 7D, no bias springs are needed in operating bidirectional SMA actuator 900. A rigid connector member 902 mechanically couples a top member 910 to a bottom member 920, and further, bidirectional SMA actuator 900 includes four wire strands: two in an outer zone and two in a middle zone. In particular, when outer zone wires 906 are powered, the output arms 915 and 925 are forced to extend away from each other, resulting in the closing of second seal 130 (if not already closed) followed by the opening of first seal 120 on the pressure side. When middle zone wires 908 are powered, then second seal 130 on the vent side is opened. In FIGS. 9A to 9C, unpowered wires are shown as dashed lines and powered wires are shown as solid lines.

FIG. 9A shows valve assembly 901 in a first configuration when middle zone wires 908 are powered, thereby opening second port ("vent port") 106. Here, second seal 130 moves from its seated position against second port 106. With first seal 120 anchoring bidirectional SMA actuator 900 to first port 108, all but one member slide (i.e., are pulled) to the right toward first port 108. Member 915 does not slide as the other members exert a net pulling force on member 915. Note that lower output member 920 slides twice as far as the others. This action extends outer zone wires 906. FIG. 9B shows the normally closed state when no power is applied. To reach this configuration, outer zone wires 906 can be powered until second seal 130 is closed while first seal 120 remains closed. FIG. 9C shows valve assembly 901 in another configuration when outer zone wires 906 are powered to open first port ("pump port") 108 while middle zone wires 908 remain unpowered. Here, all but one member slide to the right. Member 925 does not slide as the other members exert a net pushing force on member 925. Note that while outer zone wires 906 are powered, upper output member 910 slides twice as far as the others and middle zone wires 908 extend in length.

FIGS. 10A to 10D illustrate a valve assembly 1000 including bidirectional SMA actuator 900, according to a specific embodiment of the present invention. FIGS. 10A, 10B, and 10C are in positions shown in FIGS. 8B, 8C, and 8D, respectively. But in FIGS. 10A to 10C, a controller 1002 is included to control operation of valve assembly 1000. Controller 1002 includes a central processing unit ("CPU") and a memory storing executable instructions to cycle through operational states 1050 defined in FIG. 10D. FIG. 10D illustrates programmable positions 1056 of bidirectional SMA actuator 900 (also referred to as a Dual-Output Bidirectional NanoMuscle, or "DBNM" for short), where positions 1056 correspond to valve states 1058 that describe each of the operational states for valve assembly 1000. Positions 1056 are selectable by logical levels 1052 driven onto a three-wire input (i.e., inputs L1, L2, and L3), where each unique logic level is associated with a state 1050 of operation for valve assembly 1000. Power can be shutoff as indicated by main switch state 1054 when valve assembly is in a normally closed state. To illustrate the operation of controller 1002, consider that controller 1002 in FIG. 10A executes program instructions that cause logic levels 101 (onto input lines L1, L2 and L3) to be applied to bidirectional SMA actuator 900 to open the pump port, as described in valve state 1058 in FIG. 10D. As another example, consider that controller 1004 of FIG. 10B operates to configure valve assembly 1000 in accordance with one of states 1, 3, and 6 of FIG. 10D. Each of these states result in having the seals closed. And as a next example, consider that controller 1006 of FIG. 10C applies control signals corresponding to one of states 4 and 5 to open the vent port. In other embodiments, controllers 1002, 1004 and 1006 can programmatically control other states and configurations.

FIGS. 11A to 11D illustrate a valve assembly 1100 including bidirectional SMA actuator 900 implementing bi-stable outputs, according to a specific embodiment of the present invention. In FIGS. 11A to 11C, a bi-stable output 1150 includes an output member 134 extending from a plate of a bidirectional SMA actuator 900 to a seal 130. Also, bi-stable output 1150 includes a first motion-limiting pin 1102 for a closed seal state, a second motion-limiting pin 1104 for an open seal state, and a bi-stable leaf spring 1110 affixed to output member 134. Bi-stable output 1150 is configured to come to rest just short of engaging first motion-limiting pin 1102 when seal 130 is closed and to engage second motion-limiting pin 1104 when seal 130 is open. Bi-stable spring 1110 provides nearly frictionless transitions between open and closed states of seal 130 in respective FIGS. 11A and 11C (FIG. 11B shows a metastable partially opened state for seal 130). Note that pin 1102 is used to provide mechanical insurance against output over-travel, such as in case of violent vibration or excessive system pressure.

Bi-stable leaf spring 1110 is designed at proper angles, as shown in FIGS. 11A to 11C, for movement between first motion-limiting pin 1102 and second motion-limiting pin 1104 in a manner that avoids introducing side loading forces on output members 124 and 134 that otherwise might affect operation of bidirectional SMA actuator 900. Also, bi-stable leaf spring 1110 provides a preloaded force when seal 130 is closed to prevent fluid leaks. FIG. 11A depicts the case where bi-stable leaf spring 1110 is near the first motion-limiting pin 1102 when seal 130 is in a closed state. As bidirectional SMA actuator 900 begins to open seal 130, the restoring force provided by the bi-stable leaf spring 1110 decreases, thus decreasing the amount of force required by bidirectional SMA actuator 900. In FIG. 11B, seal 130 is partially opened and can continue to a fully opened state in FIG. 11C in which bi-stable leaf spring 1110 contacts second motion-limiting pin 1104. The force profile experienced by bidirectional SMA actuator 900 has a degressive characteristic, resulting in improved system longevity. In normal operation, neither of pins 1102 or 1122 is contacted by the bistable output spring, thus ensuring firm contact between seals and their respective seats. Pins 1102 and 1122 are used to provide mechanical insurance against output over-travel, such as in case of violent vibration or excessive system pressure. The bi-stable output in FIGS. 11D to 11F operates similarly as described above and need not be discussed further.

Figure 12A:
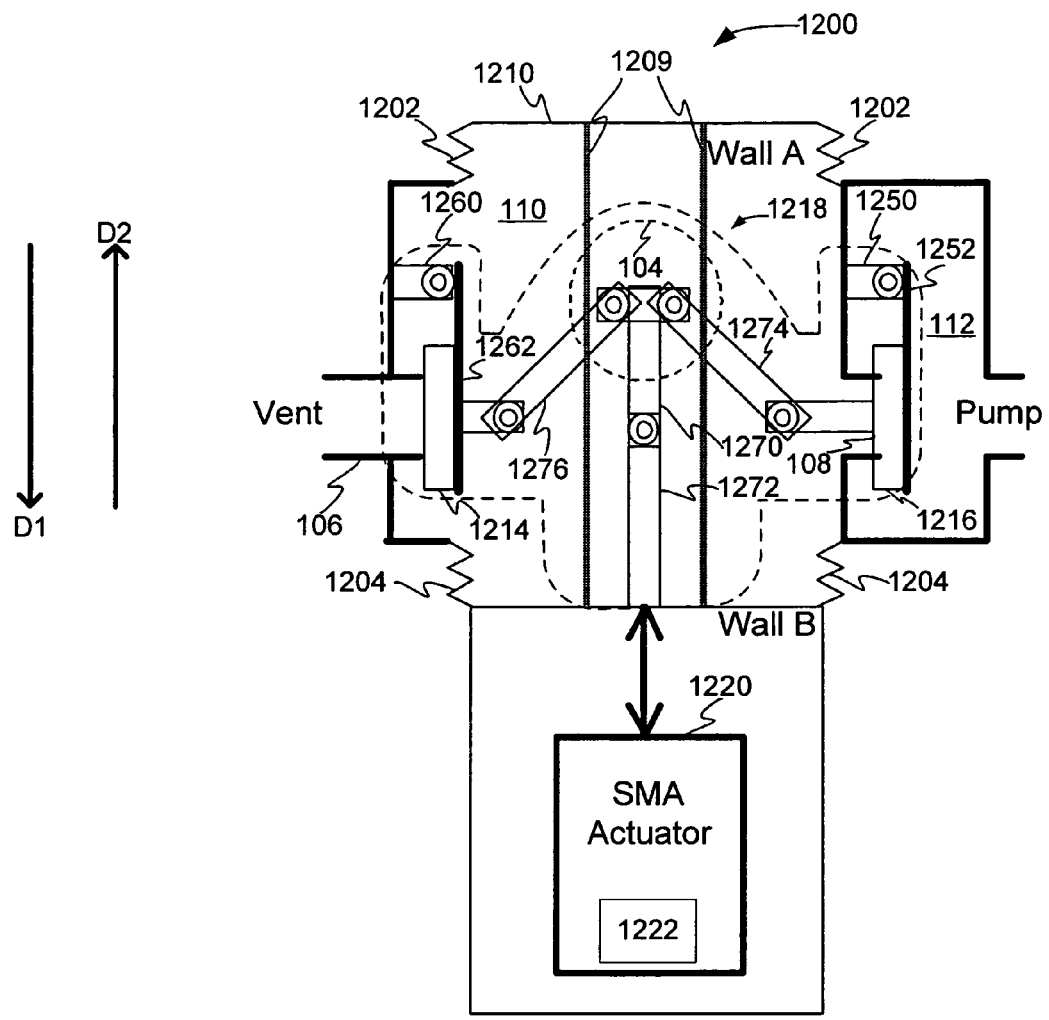
FIGS. 12A to 12C illustrate an exemplary shape memory alloy ("SMA")-actuated valve configured for external actuation, according to one embodiment of the present invention.
Figure 12B:
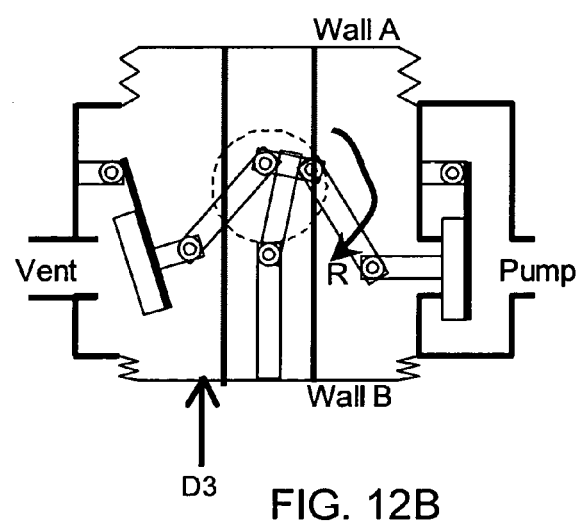
Figure 12C:
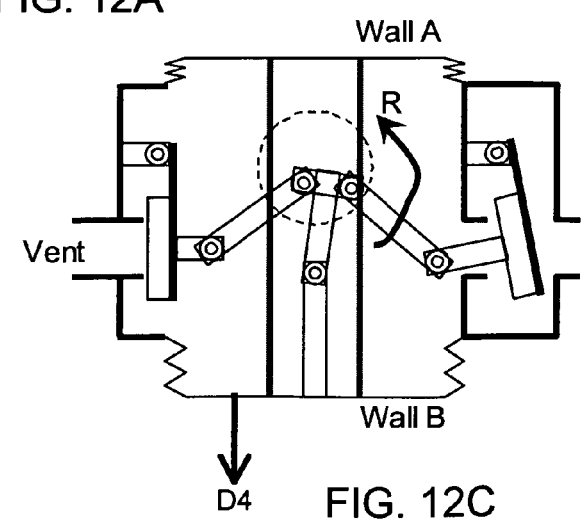

FIGS. 12A to 12C illustrate an exemplary shape memory alloy ("SMA")-actuated valve 1200 for controlling the flow of fluids, according to one embodiment of the present invention. SMA-actuated valve 1200 includes a housing 1210 having a substantially closed cavity 110 for maintaining a fluid. Further, housing 1210 including a first port 108 and a second port 106 for communicating a fluid. Housing 1210 also includes a first deformable wall 1204 and a second deformable wall 1202, which is rigidly coupled via rigid supports 1209 to first deformable wall 1202. In some instances, theses formable walls are configured to operate in an accordion-like manner. Both deformable walls 1202 and 1204 are configured to move in tandem. A first chamber 112 is accessible via first port 108. Also, first seal 1216 is disposed in first chamber 112, whereas a second seal 1214 is disposed in cavity 110. SMA-actuated valve 1200 includes an SMA actuator 1220 coupled to first deformable wall 1204 to control movement of the deformable walls 1202 and 1204, where SMA actuator 1220 is disposed external to cavity 110. SMA actuator 1220 also includes a driver circuit 1222 that is configured to adjust an amount dependent on temperature by decreasing current passing though SMA wires of SMA actuator 1220 as temperature increases. Also, SMA-actuated valve 1200 includes a linkage system 1218 configured to open first seal 1216 and to close second seal 1214 when deformable walls 1202 and 1204 move in one direction ("D1"), linkage system 1219 being further configured to close first seal 1216 and to open second seal 1214 when deformable walls 1202 and 1204 move in another direction ("D2").

In one embodiment, linkage system 1218 includes a first hinge having a first hinge member 1252 and a second hinge member 1250, where first hinge member 1252 is affixed to first seal 1216 and second hinge member 1250 is affixed to housing 1210. Linkage system 1218 also includes a second hinge having a first hinge member 1262 and a second hinge member 1260 where first hinge member 1262 is affixed to second seal 1214 and second hinge member 1260 is affixed to housing 1210. Further, linkage system 1218 includes a jointed member having a first end 1272 and a second end 1270, where first end 1272 is affixed to first deformable wall 1204 and second end 1270 includes a first link member 1274 coupled to first seal 1216 and a second link member 1276 coupled to second seal 1214. In operation, second end 1270 of the jointed member pivots in a first rotational direction when deformable walls 1202 and 1204 move in said one direction, D1, and second end 1270 pivots in a second rotational direction when deformable walls 1202 and 1204 move in said another direction.

SMA-actuated valve 1200 is an externally driven, three-way, three-position, normally closed valve. Here, the seals of this valve also open toward the high-pressure side. Since the two seals are manipulated by means of a system of linkages, the internal environment of SMA-actuated valve 1200 can be segregated from SMA actuator 1220. There are a number of benefits attendant to this configuration: (a) corrosive gases may be controlled without the danger of corrosion to the actuator parts, (b) for very low cost applications it becomes possible to eliminate the actuator and drive the valve manually, (c) the mechanism being free of sliding friction, very low driving forces are possible, and (d) with the actuator and the valve being two different modules, it is possible to replace or repair either while retaining the other, thus reducing replacement and maintenance costs.

Note that actuation of SMA-actuated valve 1200 can be performed in other ways than using SMA actuator 1220, such as manually, if the deformable walls are flexible and joined by rigid links 1209; with two unidirectional actuators such as those shown in FIGS. 7A to 7D, with each pulling on flexible walls 1202 and 1204 at different times; with an actuator external to a flexible wall 1204 and a rigid wall substituting deformable wall 1202; or with an internal actuator where both walls 1202 and 1204 are rigid. Also note that the middle position is the normally closed position. As shown in FIG. 12B, movement towards wall 1202 in direction D3 opens the vent port 106 as second end 1270 of the jointed member pivots as shown (i.e., clockwise). As shown in FIG. 12C, movement towards wall 1204 in direction D4 will close vent port 106, and if taken even further, will open pump port 108. In this example, port pressures are arranged in the following sequence: Pvent<Puser<Ppump.

Figure 13A:
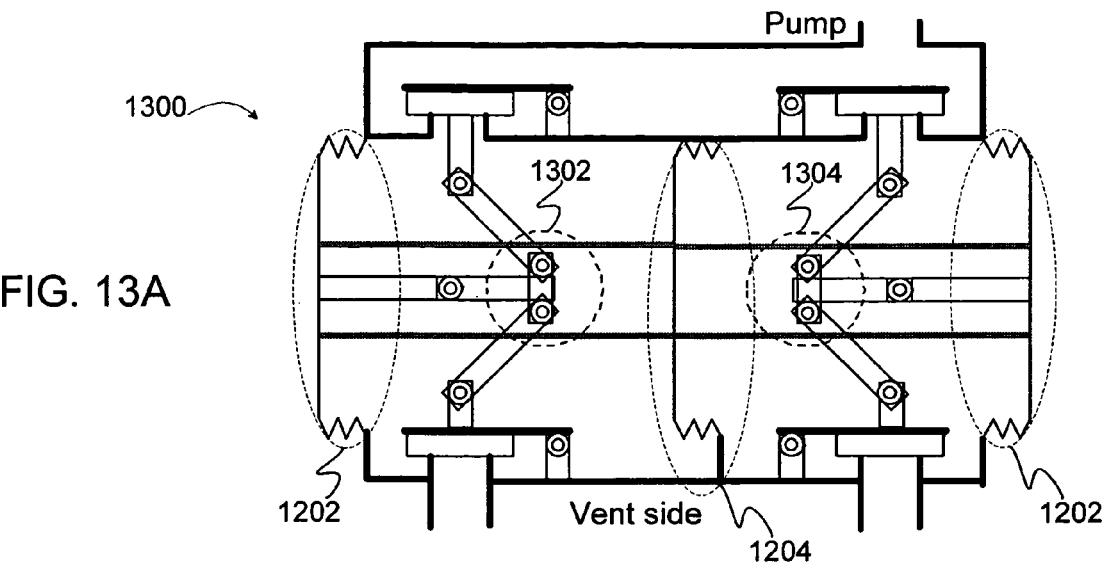
FIGS. 13A to 13C illustrate an exemplary four-way, three-position normally-closed valve implementing SMA-actuated valve of FIGS. 12A to 12C, according to one embodiment of the present invention.
Figure 13B:
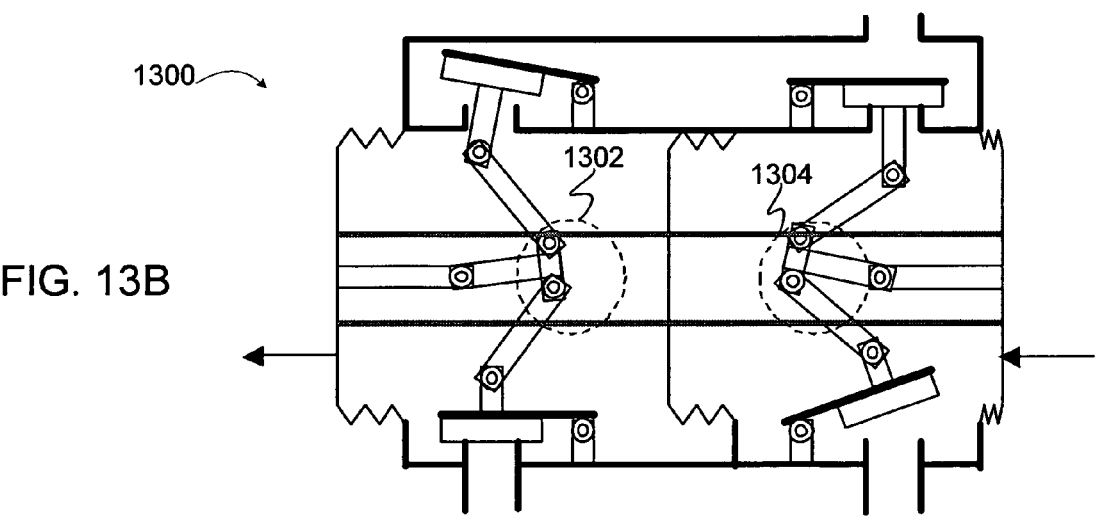
Figure 13C:
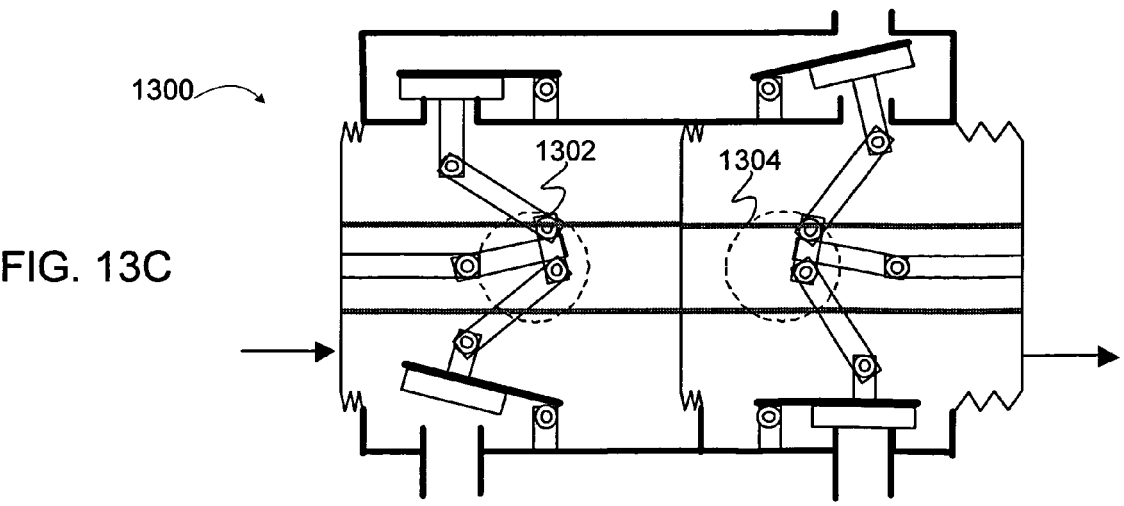

FIGS. 13A to 13C illustrate an exemplary four-way, three-position normally-closed valve implementing SMA-actuated valve 1200, according to one embodiment of the present invention. Valve 1300 shown in these figures is constructed from two copies of SMA-actuated valve 1200 arranged side-by-side, with the pump ports joined. The operations of valve 1300 are readily understood by reference to FIGS. 13A to 13C. In FIG. 13A, one or mores SMA actuators are configured to place the deformable walls 1202, 1204 in a middle position ("off"). That is, user ports 1302 and 1304 are not changing. In FIG. 13B, an SMA actuator (not shown) is configured to displace deformable walls 1202, 1204 to the left, where user port 1302 is pressurizing and user port 1304 is venting. In FIG. 13C, an SMA actuator (not shown) is configured to displace deformable walls 1202, 1204 to the right, where user port 1302 is venting and user port 1304 is pressurizing.

Figure 14A:
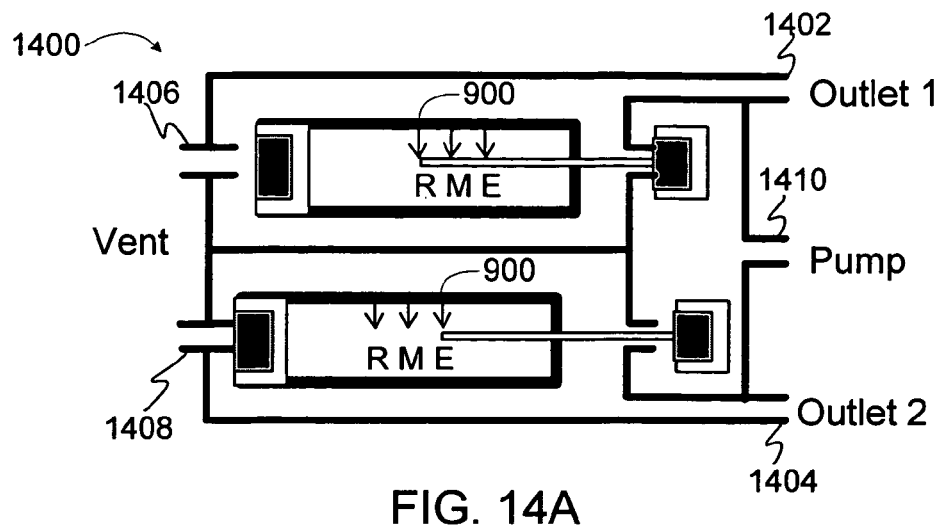
FIGS. 14A to 14C illustrate an exemplary four-way, three-position, normally-closed valve that implements an SMA-actuated valve of FIG. 8A, according to one embodiment of the present invention.
Figure 14B:
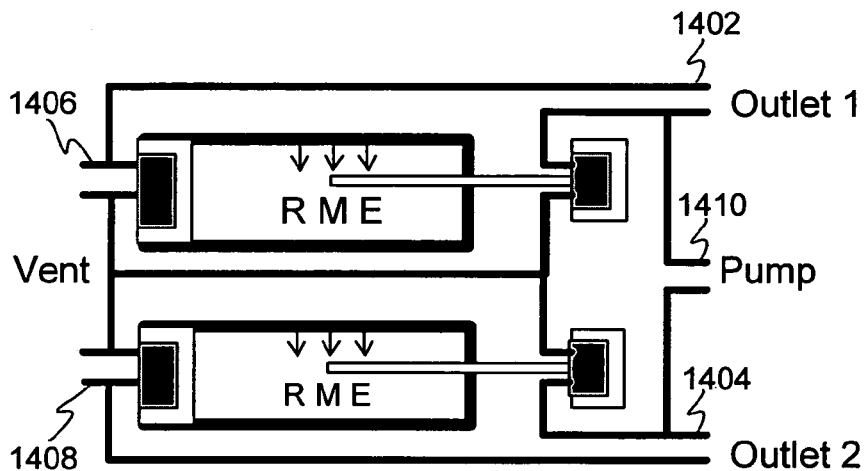
Figure 14C:
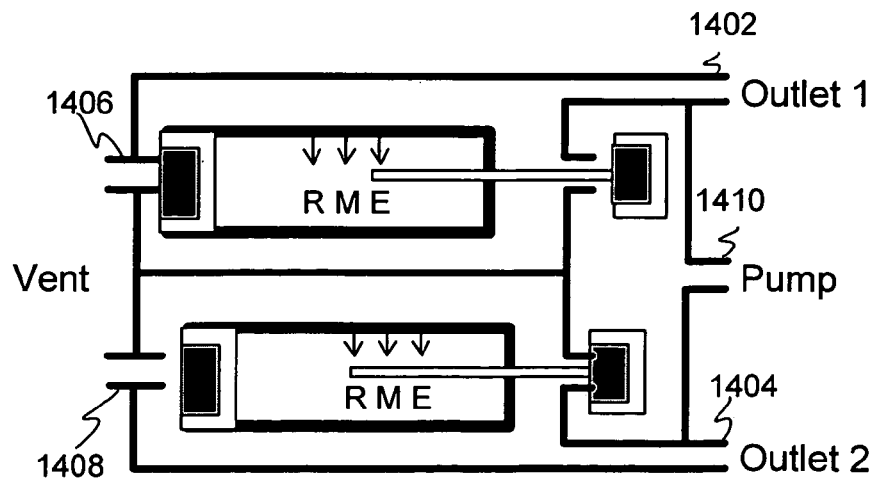

FIGS. 14A to 14C illustrate an exemplary four-way, three-position valve, normally-closed valve that implements SMA-actuated valve 800 of FIG. 8A, according to one embodiment of the present invention. Valve 1400 is a four-way, normally closed valve, which is internally driven by two independent bidirectional SMA actuators 900, each with three positions. Conceptually, valve 1400 is constructed using two versions of SMA-actuated valves 800. In FIG. 14A, a first user port 1402 as outlet port 1 is venting through 1406 and a second user port 1404 as outlet 2 is pumping through pump port 1410. In FIG. 14B, both user ports 1402, 1404 (i.e., "outlet port 1" and "output port 2") are isolated from either vent ports 1406, 1408 or pump port 1410. In FIG. 14C, a first user port 1402 as outlet port 1 is pumping and a second user port 1404 as outlet 2 is venting.

Figure 15A:
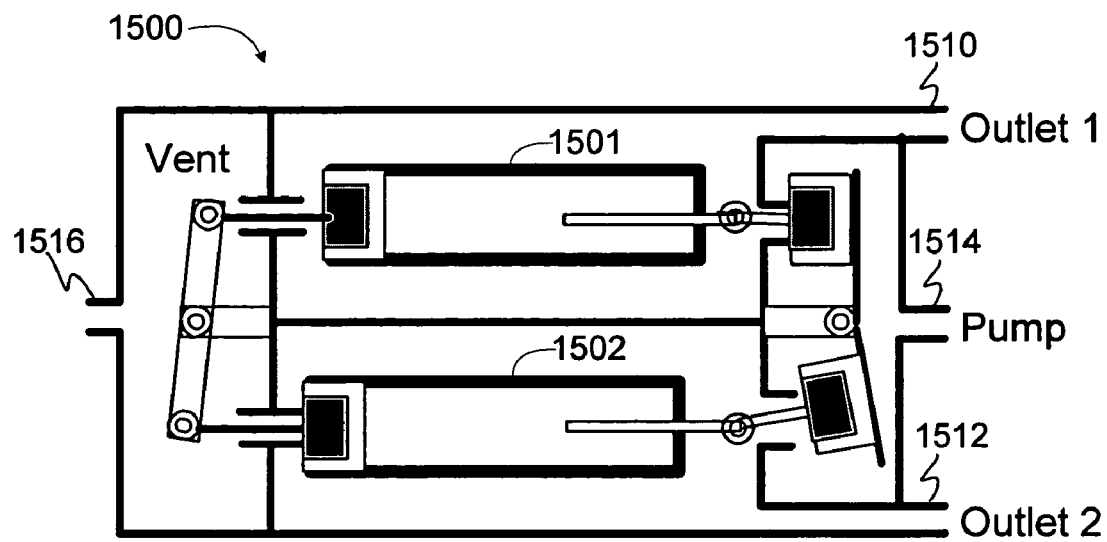
FIGS. 15A and 15B illustrate an exemplary four-way, two-position valve, internally driven by two unidirectional actuators operating in antagonistic fashion, according to one embodiment of the present invention.
Figure 15B:
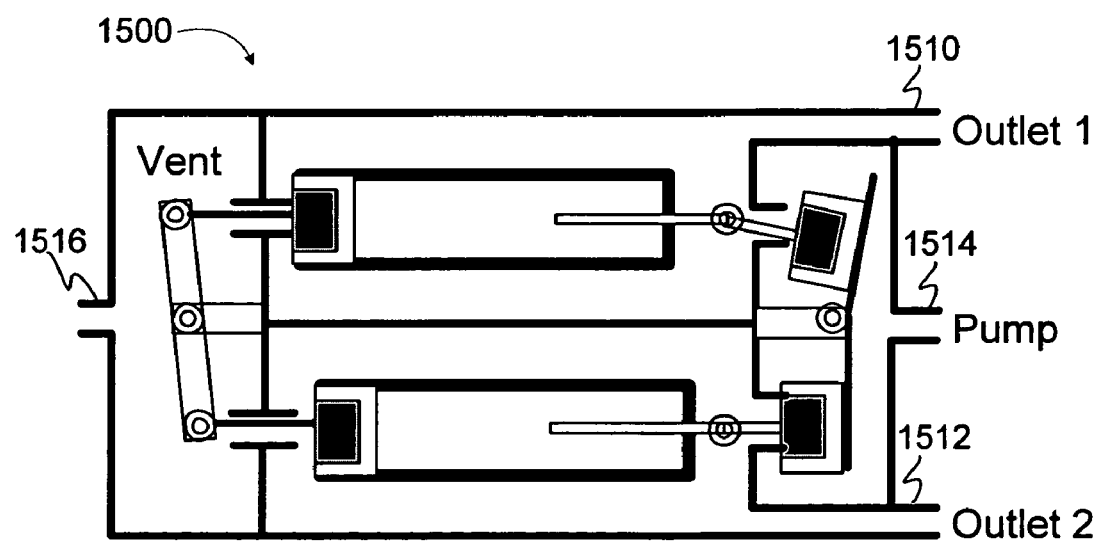

FIGS. 15A and 15B illustrate an exemplary four-way, two-position valve, internally driven by two unidirectional actuators operating in an antagonistic fashion, according to one embodiment of the present invention. Being in antagonistic configuration makes valve 1500 particularly applicable for driving by presently existing SMA actuators. As shown in FIG. 15A, at the conclusion of its contraction, one actuator of either SMA actuators 1501 and 1502 is restored to its relaxed, initial state by energizing the other SMA actuator as an antagonist. The use of antagonistic actuators requires energizing the actuators one-at-a-time, which results in simplified operation. In FIG. 15A, actuator 1501 is contracted to enable outlet ("1") 1510 to vent though vent port 1516 while outlet ("2") 1512 is pumping through pump port 1514. In FIG. 15B, actuator 1502 is contracted to enable outlet ("2") 1514 to vent while outlet ("1") 1510 is pumping.

Figure 16A:
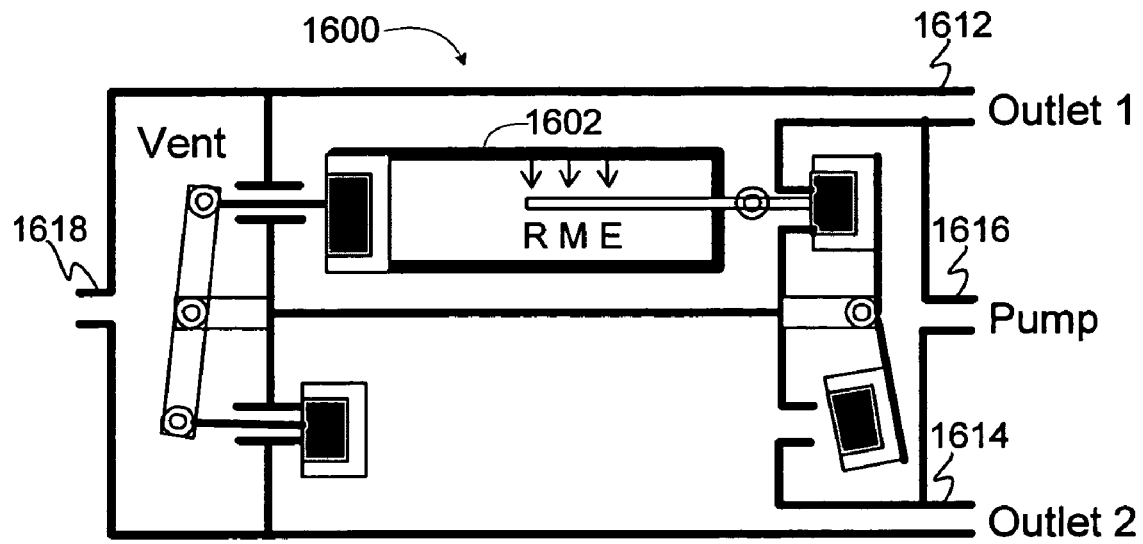
FIGS. 16A and 16B illustrate an exemplary four-way, two-position valve, internally driven by a bidirectional actuator, according to one embodiment of the present invention.
Figure 16B:
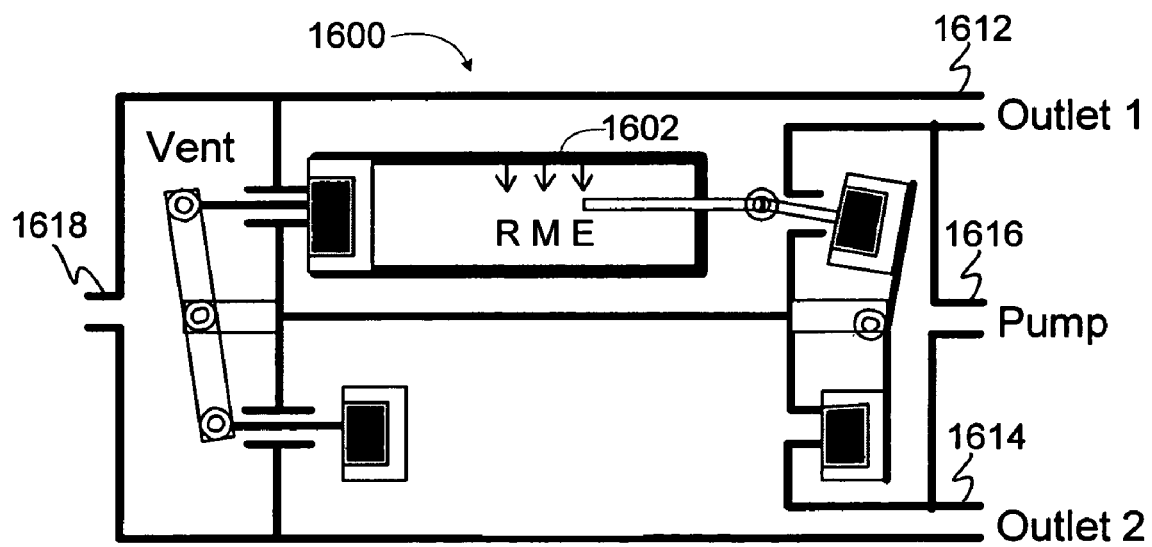

FIGS. 16A and 16B illustrate an exemplary four-way, two-position valve, internally driven by a bidirectional actuator, according to one embodiment of the present invention. Valve 1600 has a reduced number of ports compared to valve 1500 of FIGS. 15A and 15B, which is an advantage as there is less interconnecting material required. In FIG. 16A, actuator 1602 is retracted such that outlet ("1") 1612 is venting through vent port 1619 and outlet ("2") is pumping through pump port 1616. In FIG. 16B, actuator 1602 is extended such that outlet ("2") 1614 is venting and outlet ("1") 1612 is pumping.

Figure 17A:
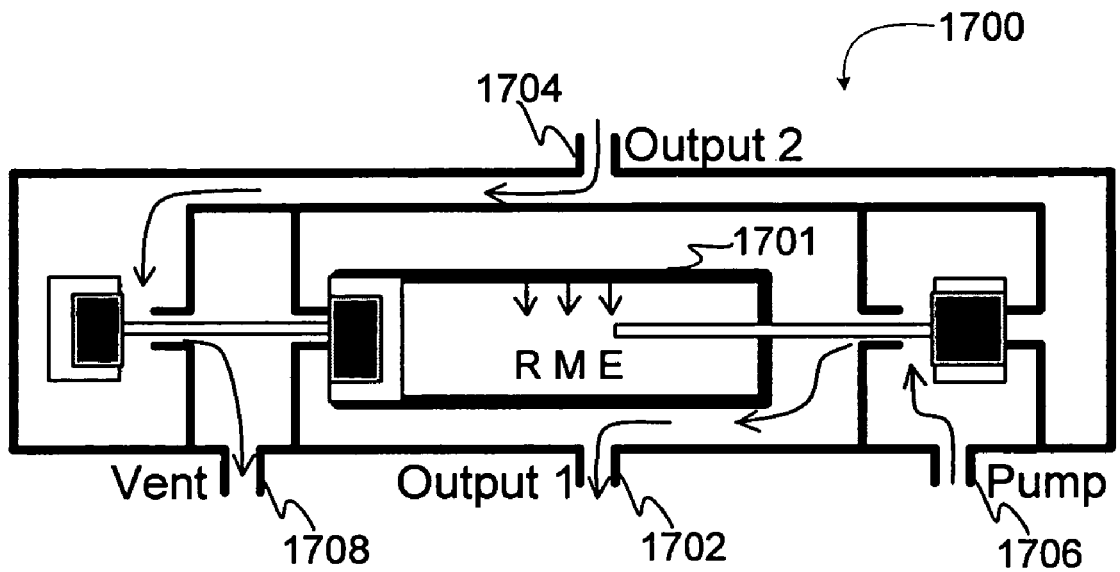
FIGS. 17A and 17B illustrate an exemplary four-way, two-position valve, driven by one unidirectional actuator, according to one embodiment of the present invention.
Figure 17B:
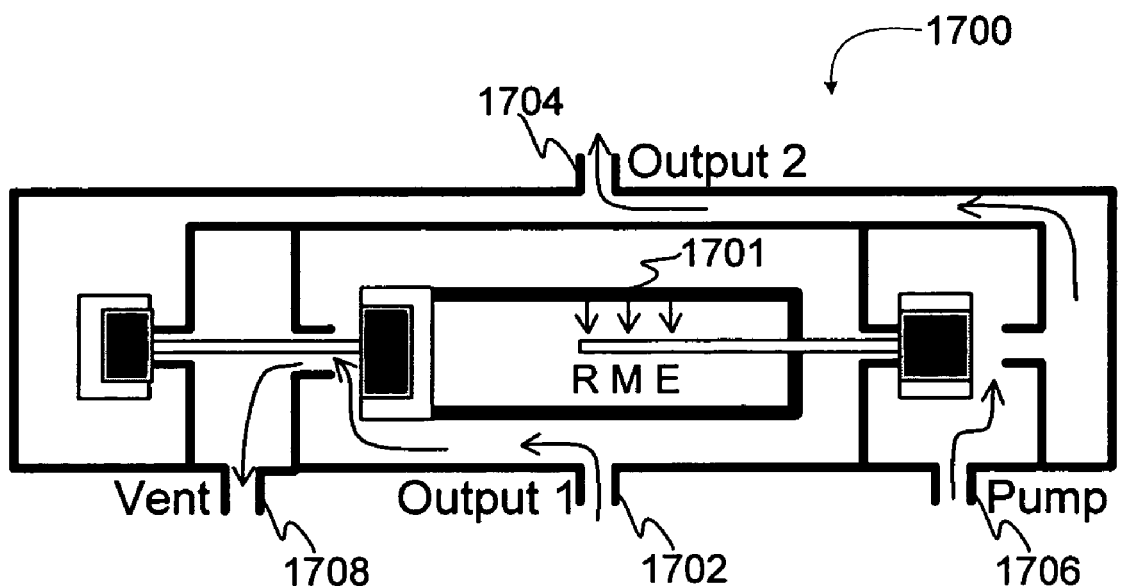

FIGS. 17A and 17B illustrate an exemplary four-way, two-position valve, driven by one unidirectional actuator, according to one embodiment of the present invention. Valve 1700 removes levers and hinges to significantly simplify valve construction In FIG. 17A, actuator 1701 is extended such that outlet ("1") 1702 is pumping through pump port 1706 and outlet ("2") 1704 is venting through vent port 1708. In FIG. 17B, actuator 1701 is retracted such that outlet ("1") 1702 is venting and outlet ("2") 1704 is pumping.

The foregoing description, for purposes of explanation, used specific nomenclature to provide a thorough understanding of the invention. However, it will be apparent to one skilled in the art that specific details are not required in order to practice the invention. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. Any feature of any specific embodiment of the present invention can be employed in any embodiment described herein. It is intended that the following claims and their equivalents define the scope of the invention.

The invention claimed is:

1. A three-way, three-position valve system including two shape memory alloy ("SMA")-actuated valves for controlling the flow of fluids, the valve system comprising:
   a housing having a substantially closed cavity for maintaining a pressurized fluid, said cavity including a first inlet port, a first outlet port connected to a user device actuatable by the pressurized fluid, and a second outlet port connected to a vent;
   a first SMA-actuated valve including a first seal for closing and opening said first inlet port to selectively provide pressurized fluid to the cavity, a first SMA actuator configured to control the position of said first seal to vary fluid flow through said first inlet port, and a first temperature compensator for negating contraction forces generated by said first SMA actuator due to temperature;
   a second SMA-actuated valve including a second seal for closing and opening said second outlet port to selectively vent the cavity of pressurized fluid to depressurize the user device, either a bidirectional SMA actuator or a unidirectional SMA actuator configured to control the position of said second seal to vary fluid flow through said second outlet port, and a second temperature compensator negating contraction forces generated by said second SMA actuator due to temperature;
   the second outlet port being located along the cavity closer to the first outlet port than to the first inlet port thereby defining a direct pressurized fluid vent path from the user device to the vent.

2. The valve system of claim 1 wherein said first SMA-actuated valve is a wire-based SMA actuator, said wire-based SMA actuator being disposed within said cavity.

3. The valve system of claim 2 wherein said wire-based SMA actuator comprises:
   a plunger having a first plunger end adapted to include said first seal, a second plunger end and a shaft;
   an SMA wire having a first wire end coupled to a first anchor point, a second wire end coupled to a second anchor point, and a central wire portion engaging said plunger for imparting a linear force; and
   a restoring device configured to provide a restoring force to return said first plunger end in a first direction to a first position and to restore said SMA wire to a fully extended condition,
   wherein said SMA wire generates contraction forces when power is applied thereto, said contraction forces causing said central portion to apply said linear force greater than said restoring force, thereby causing displacement of said first plunger end in a second direction.

4. The valve system of claim 3 wherein said wire-based SMA actuator further comprises:
   a base including said first anchor point and said second anchor point; and
   a coiled spring arranged coaxially about said shaft as said restoring device, said coiled spring being a compression spring that contacts said first plunger end.

5. The valve system of claim 4 wherein said wire-based SMA actuator further comprises:
   a temperature compensating SMA wire as said first temperature compensator, said temperature compensating SMA wire having a first wire end coupled to a third anchor point, a second wire end coupled to a fourth anchor point, and a second central wire portion engaging said second plunger end for imparting a compensating linear force in said first direction, said base furthering including said third anchor point and said fourth anchor point,
   wherein said compensating linear force counters said contraction forces of said SMA wires above a certain temperature, thereby assisting said coiled spring in restoring said first plunger position to said first position.

6. The valve system of claim 5 wherein the transition temperature of said temperature compensating SMA wire is less than that of said SMA wire.

7. The valve system of claim 3 wherein said base is a printed circuit board ("PCB") including conductive paths to either open or close a circuit to activate an end of a travel switch.

8. The valve system of claim 7 wherein said second plunger end is adapted to include a collapsible contact configured to collapse onto another contact when said first plunger end reaches said second position thereby closing a circuit to remove power from said SMA wire.

9. The valve system of claim 7 wherein said wire-based SMA actuator further comprises a switch for receiving said second plunger end when said first plunger end reaches said second position, said switch being an end of travel switch configured to remove power from said SMA wire.

10. The valve system of claim 2 wherein said wire-based SMA actuator comprises:
    a plunger having a first plunger end adapted to include said first seal, a second plunger end and a shaft;
    an SMA wire having a first wire end coupled to a first anchor point and a second wire end coupled to a second anchor point; and
    a leaf spring including said first anchor point and said second anchor point, said leaf spring being a restoring device to provide a restoring force to return said first plunger end in a first direction to a first position and to restore said SMA wire to a fully extended condition, said leaf spring is affixed to said second plunger end at a curvature point; and
    a base adapted to anchor said leaf spring,
    wherein said SMA wire generates contraction forces when power is applied thereto, said contraction forces causing said leaf spring to bend, thereby causing said curvature point on said leaf spring to impart a linear force greater than said restoring force to said second plunger end, thereby causing displacement of said first plunger end in a second direction.

11. The valve system of claim 2 wherein said first temperature compensator is a driver circuit configured to adjust said contraction forces dependent on temperature by decreasing current passing through said SMA wire with increasing temperature above a certain temperature.

12. The valve system of claim 11 wherein said wire-based SMA actuator comprises: a base;
    a plunger having a first plunger end adapted to include said first seal, a second plunger end and a shaft;

a first linkage having a first anchor point, a first attachment point and a first joint;

a second linkage having a second anchor point, a second attachment point and a second joint, said first anchor point and said second anchor point being coupled to said base and said first attachment point and said second attachment point coupled to said second plunger end for imparting a linear force;

an SMA wire having a first wire end coupled to said first joint and a second wire end coupled to said second joint; and a restoring device configured to provide a restoring force to return said first plunger end in a first direction to a first position and to restore said SMA wire to a fully extended condition, wherein said SMA wire generates contraction forces when power is applied thereto, said contraction forces moving said first joint and said second joint closer in distance, which in turn causes said first attachment point and said second attachment point to apply said linear force greater than said restoring force, thereby causing displacement of said first plunger end in a second direction.

13. The valve system of claim 12 wherein said restoring device is a coiled spring arranged coaxially about said shaft, said coiled spring being a compression spring that contacts said first plunger end, wherein said first attachment point and second attachment point are configured to pivot about an axis, said first anchor point and said second anchor point are configured to pivot about another axis, and members of said first linkage and second linkage pivot about said first joint and said second joint, respectively.

14. The valve system of claim 12 wherein said first anchor point and said second anchor point are rigidly attached to an insulating collar, which includes a passage to permit said plunger to travel through said insulating collar, said first attachment point and second attachment point are rigidly attached to an insulating cap, which is attached to said second plunger end, and said first joint and said second joint each are torsion springs that constitute said restoring device, wherein said first and said second linkages are conductive to provide power to said SMA wire.

15. The valve system of claim 11 wherein said wire-based SMA actuator comprises:

a base having a slideable mount and a base anchor point;

a plunger having a first plunger end adapted to include said first seal, a second plunger end and a shaft;

a first linkage having a first anchor point at one end that is pivotally coupled to said slideable mount, an attachment point at another end pivotally coupled to said second plunger end for imparting a linear force, and a fulcrum point;

a second linkage having a second anchor point at one end of said second linkage that is pivotally coupled to said base anchor point, said second linkage being pivotally coupled to said fulcrum point at another end of said second linkage, said second linkage having a shorter length than said first linkage;

an SMA wire having a first wire end coupled to said first anchor point and a second wire end coupled to said second anchor point; and a restoring device configured to provide a restoring force to return said first plunger end in a first direction to a first position and to restore said SMA wire to a fully extended condition, wherein said SMA wire generates contraction forces when power is applied thereto, said contraction forces sliding said slideable mount toward said base anchor point, which in turn causes said attachment point to apply said linear force greater than said restoring force, thereby causing displacement of said first plunger end in a second direction.

16. The valve system of claim 1 wherein said second SMA-actuated valve further comprises a unidirectional SMA actuator, said unidirectional SMA actuator being disposed within said cavity, said unidirectional SMA actuator including at least three rigid parallel-elongate members, each having a long axis and being slideable relative to one another parallel to that long axis, each connected one to another by an SMA wire such that the stroke of the actuator is substantially equal to the sum of the stroke of the SMA wires, wherein a top plate of said unidirectional SMA actuator is rigidly affixed to an anchor point in said cavity and a bottom plate includes said second seal.

17. The valve system of claim 1 wherein said second SMA-actuated valve further comprises a bidirectional SMA actuator, said bidirectional SMA actuator being disposed within said cavity, said bidirectional SMA actuator including at least five rigid parallel elongate members, each having a long axis and being slideable relative to one another parallel to that long axis, each connected one to another by an SMA wire such, said at least five rigid parallel elongate members include a top plate rigidly linked to a bottom plate and middle plates, said middle plates including a top-middle plate and a bottom-middle plate wherein said top-middle plate is rigidly affixed to an anchor point in said cavity and said bottom-middle plate includes said second seal.

18. A three-way, three-position valve system including a number of shape memory alloy ("SMA")-actuated valves for controlling the flow of fluids, the valve system comprising:

a housing defining a substantially closed cavity;

means for maintaining a pressurized fluid in said cavity, said means including a first port for admitting pressurized fluid into the cavity and a second port for transferring pressurized fluid to a user device, and a vent port for venting pressuring fluid from the user device via the cavity, the second port being closer to the vent port than to the first port;

a first SMA-actuated valve including first sealing means for closing and opening said first port, first SMA actuation means for controlling the position of said first seal to vary fluid flow into the cavity through said first port, and first temperature compensation means for negating contraction forces generated by said first SMA actuator due to temperature; and a second SMA-actuated valve including second sealing means for closing and opening said second port, bidirectional SMA actuation means for controlling the position of said second seal to vary fluid flow from the user device through said second port and into the vent, and second temperature compensation means for negating contraction forces generated by said second SMA actuator due to temperature.

* * * * *

UNITED STATES PATENT AND TRADEMARK OFFICE
CERTIFICATE OF CORRECTION

| | | |
|---|---|---|
| PATENT NO. | : 7,748,405 B2 | Page 1 of 1 |
| APPLICATION NO. | : 10/934825 | |
| DATED | : July 6, 2010 | |
| INVENTOR(S) | : Ghorbal et al. | |

It is certified that error appears in the above-identified patent and that said Letters Patent is hereby corrected as shown below:

On page 3 of the cover under Item (56) FOREIGN PATENT DOCUMENTS, please delete the second listing "FR 0147491   7/1985" and replace with "EP 0147491   7/1985"

Signed and Sealed this
Thirtieth Day of October, 2012

David J. Kappos
*Director of the United States Patent and Trademark Office*